United States Patent
Low et al.

(10) Patent No.: US 11,901,816 B2
(45) Date of Patent: Feb. 13, 2024

(54) START-UP OF STEP-UP POWER CONVERTER WITH SWITCHED-CAPACITOR NETWORK

(71) Applicant: pSemi Corporation, San Diego, CA (US)

(72) Inventors: Aichen Low, Cambridge, MA (US); Gregory Szczeszynski, Hollis, NH (US); Oscar Blyde, Melrose, MA (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/785,802

(22) Filed: Feb. 10, 2020

(65) Prior Publication Data
US 2021/0006156 A1  Jan. 7, 2021

Related U.S. Application Data

(63) Continuation of application No. 16/016,794, filed on Jun. 25, 2018, now abandoned.

(51) Int. Cl.
*H02M 3/07* (2006.01)
*H02M 1/36* (2007.01)

(52) U.S. Cl.
CPC .............. *H02M 3/07* (2013.01); *H02M 1/36* (2013.01)

(58) Field of Classification Search
CPC .......... H02M 1/36; H02M 3/07; H02M 3/073; H02M 3/156; H02M 3/158; H02M 1/007
See application file for complete search history.

(56) References Cited

U.S. PATENT DOCUMENTS

| | | | |
|---|---|---|---|
| 7,145,382 B2 | 12/2006 | Ker | |
| 8,724,353 B1 | 5/2014 | Giuliano | |
| 8,817,501 B1 | 8/2014 | Low | |
| 8,860,396 B2 | 10/2014 | Giuliano | |
| 2011/0298438 A1* | 12/2011 | Shi | H02M 1/08 323/282 |
| 2014/0327479 A1* | 11/2014 | Giuliano | H02M 3/07 327/536 |
| 2015/0364992 A1 | 12/2015 | Kwon | |
| 2017/0054363 A1 | 2/2017 | Mangtani | |

\* cited by examiner

*Primary Examiner* — Patrick C Chen
(74) *Attorney, Agent, or Firm* — Finnegan, Henderson, Farabow Garrett & Dunner LLP

(57) ABSTRACT

A step-up power-converter has stack nodes, each of which connects to a stack switch and to a pump capacitor to form a switched-capacitor network. Among the stack nodes are first and second stack-nodes. The second stack-node drives a particular stack switch from the plurality of stack switches. When all of the stack switches are open, the first voltage causes the first stack-node to have a first stack-node voltage and causes the second stack-node to have a second stack-node voltage that is less than the first stack-node voltage. During the first state, the second stack-node voltage is insufficient to drive the particular stack-switch. During the second state, the second stack-node voltage is sufficient to drive the particular stack-switch. Causing the switched-capacitor network to transition from the first state to the second state includes, among other things, causing the second stack-node voltage to become sufficient to drive the particular stack-switch.

19 Claims, 13 Drawing Sheets

START-UP OF STEP-UP POWER CONVERTER WITH SWITCHED-CAPACITOR NETWORK

CROSS REFERENCE TO RELATED APPLICATION

This application is a continuation of U.S. application Ser. No. 16/016,794, filed Jun. 25, 2018, the contents of which are hereby incorporated by reference in their entirety.

FIELD OF INVENTION

This invention relates to power converters, and in particular, to the start-up of a switched-capacitor network in a power converter.

BACKGROUND

Electronic devices typically demand a stable DC power supply for correct operation. A battery does not necessarily achieve this goal. After all, as a battery discharges, its voltage drops. Therefore, some way must be found to present the electronic device with a stable voltage.

A useful solution is a step-up power converter that converts the battery's dwindling voltage into a steady voltage tuned to the requirements of the device. At the heart of many such power converters is a capacitor network. In such a capacitor network, charge is made to flow from one capacitor to the next in such a way that the voltage at its output is a multiple of either an integer or a reciprocal of an integer. The former is used as a step-up power converter and the latter is used as a step-down power converter. Because their operation resembles that of a pump, such a network is often called a "charge pump."

In some cases, diodes are strategically placed among the capacitors to prevent charge that has been pumped to a higher voltage from flowing back to the lower voltage from which it came. This method has the advantage of being passive and hence does not require control.

In other cases, active switches are used instead of passive diodes. The use of active switches results in increased complexity, since a controller must now be provided to control when to turn them on and off. However, the resulting charge pump is more efficient in part because one no longer has to incur the voltage drop inherent across a diode's PN junction. This can sometimes reduce the number of stages required to carry out the voltage transformation. Capacitor networks of this type are often called "switched-capacitor networks."

A switched-capacitor network has switches that interconnect various capacitors in different configurations. The switches themselves are typically implemented using transistors. As such, to turn them on and off, it is necessary to apply a sufficient voltage across the transistor's gate and source terminals. A question that naturally arises is where this voltage is supposed to come from.

SUMMARY

The invention provides ways to assist a switched-capacitor network at start-up so that it can achieve self-sustaining operation as quickly as possible and across a wide range of input voltages.

In one aspect, the invention features a step-up power-converter having stack-nodes, each of which connects to a stack switch and to a pump capacitor to form a switched-capacitor network. The network has an input terminal that receives a first voltage and an output terminal that outputs a second voltage that exceeds the first voltage. A controller uses the first voltage to cause the switched-capacitor network to transition from operating in a first state to operating in a second state. Among the stack-nodes are first and second stack-nodes. The second stack-node drives a particular stack-switch from the plurality of stack switches. When all the stack switches are open, the first voltage causes the first stack-node to have a first stack-node voltage and causes the second stack-node to have a second stack-node voltage that is less than the first stack-node voltage. During the first state, the second stack-node voltage is insufficient to drive the particular stack-switch. By the second state, the second stack-node voltage will have become sufficient to drive the particular stack-switch. Causing the switched-capacitor network to transition from the first state to the second state includes, among other things, causing the second stack-node voltage to become sufficient to drive the particular stack-switch.

In another aspect, the invention includes a step-up power-converter that comprises a controller, stack switches, and stack nodes. Each stack node connects to one of the stack switches and to a pump capacitor to form a switched-capacitor network that has an input terminal and an output terminal. The input terminal receives a first voltage and the output terminal outputs a second voltage that exceeds the first voltage. Among the stack nodes are first and second stack nodes. The second stack node drives one of the stack switches. The controller uses the first voltage to cause the switched-capacitor network to transition from operating in a first state to operating in a second state. In the first state, the first state, the first stack-node to has a first stack-node voltage and the second stack-node has a second stack-node voltage that is less than the first stack-node voltage and also insufficient to drive the stack switch that it is supposed to drive. In the second state, the second stack-node has developed a voltage that is sufficient to drive that stack-switch.

Some embodiments include a lockout circuit configured to transition into a state in which the lockout circuit prevents the particular stack-switch from being driven by the second stack-node. This is particularly useful because the stack switch is typically implemented as a transistor that has a body-diode. This body-diode can be relied upon to operate, albeit less efficiently, until the second stack-node has built up enough voltage to reliably operate that transistor. The lockout circuit thus prevents the second stack-node from attempting to operate the stack switch prematurely, before it has acquired the voltage that it needs to do so.

Other embodiments include a lockout circuit configured to prevent the particular stack-switch from being driven by the second stack-node when the second stack-node voltage is below a predetermined threshold. This is particularly important because different second stack-nodes will arrive at their required voltage at different times. For example, second stack-nodes that are closer to the circuit's input will enjoy a head start in reaching their target voltage compared to second stack-nodes that are further from the circuit's input. As such, these will tend to reach their target voltage sooner. By switching over to the use of a switch rather than the body-diode, it is possible to bypass the inherent body-diode voltage drop that much sooner, thus accelerating the rate at which the remaining stack-nodes climb towards their target operating voltages. Because of this feature, there will be times during the start-up of the network's operation in which some but not all stack switches are being operated.

Yet other embodiments include a comparator having first and second inputs and an output. The first input connects to a predetermined threshold voltage and the second input connects to a voltage that depends on the second stack-node voltage. The comparator outputs a signal indicative of whether the voltage that depends on the second stack-node voltage is equal to or higher than the predetermined threshold voltage. This signal selectively prevents the second stack-node voltage from being used to operate the particular stack-switch.

Also among the embodiments are those in which first and second resistors connect across a supply voltage to form a voltage divider. These embodiments also include a comparator having first and second inputs and an output, with the first input connecting to a node between the first and second resistors and the second input connecting to a voltage source that provides a predetermined threshold voltage. In these embodiments, a signal at the output indicates whether the predetermined threshold voltage is less than a voltage at the node. This signal is used to selectively prevent the second stack-node voltage from being used to operate the particular stack-switch.

In yet other embodiments, the switched-capacitor network includes first and second stack-nodes. The first pump capacitor connects to the first stack-node and a second pump capacitor connects to the second stack node. A plurality of stack switches connects the second stack node to the input terminal. A bypass path extends between the input terminal and the second stack node. This bypass path bypasses the first stack-node, the plurality of stack switches, and the first pump capacitor.

In some embodiments, the power converter includes a path that connects the input terminal to the second stack-node and bypasses at least one other stack-node. This path becomes inoperative when the switched-capacitor network begins transitioning from the first state to the second state. However, during the first state, the path is used to bias each stack node at least part of the way to its required operating voltage to give the stack nodes a head start the next time the switched-capacitor network starts up and transitions from the first state to the second state.

Yet other embodiments include a plurality of bypass paths, each of which extends between the input terminal and one of the stack nodes. Each of the bypass paths fails to conduct current from the input terminal to each of the stack nodes when the switched-capacitor network transitions from the first state to the second state.

Some embodiments include a diode along a path that connects the first terminal and the second stack-node. This path bypasses at least one of the stack nodes. The diode blocks current from the second stack-node to the input terminal during the first and second states. During the first state, current flows through the path. This current ceases following transition into the second state.

Yet other embodiments include a switch along a path that connects the first terminal and the first pump capacitor, bypassing at least one other pump capacitor in the process. The switch closes during the first state and opens during the second state.

Other embodiments include a path that connects the input terminal to the output terminal. Current flows along this path between the input and output terminals during the first state. This current ceases during the second state.

Among other embodiments are those that include a switch that connects to the input terminal. In these embodiments, the controller controls the switch so as to cause a voltage having a predetermined slew rate to be present at the input terminal.

In some embodiments, an intermediate capacitor connects to the input terminal of the charge pump and an inductor lies between the power converter's input port and the input terminal of the charge pump. A switch selectively connects and disconnects the LC filter from the input terminal. The controller times the switch's opening and closing to induce current in the LC filter, thereby causing charge to be delivered to the intermediate capacitor. Although the amount of charge is generally not enough to bring the pump capacitors to the required voltages, it is nevertheless made available to assist in doing. It also times the switch's opening to prevent charge stored in the intermediate capacitor from escaping towards the LC filter.

In yet other embodiments, a boost converter connects between the power converter's input port and the input terminal of the charge pump. The controller controls the boost converter such that the boost converter provides a voltage to the input terminal. The voltage being provided to the input terminal exceeds a voltage that is being provided to the input port.

In other embodiments, the switched-capacitor network includes a phase switch that connects to one of the pump capacitors opposite one of the stack nodes. In these embodiments, the controller operates the phase switch so as to collapse the first voltage during the first state.

In still other embodiments, during the first state, the controller operates the switched-capacitor network so as to collapse the first voltage, thereby inducing current directed toward the switched-capacitor network so as to cause a voltage at the input terminal to surpass the first voltage.

Also among the embodiments are those in which, during the first state, the controller operates the switched-capacitor network so as to control a slew rate of the first voltage.

These and other features of the invention will be apparent from the following detailed description and the accompanying figures, in which:

DETAILED DESCRIPTION

Figure 1:
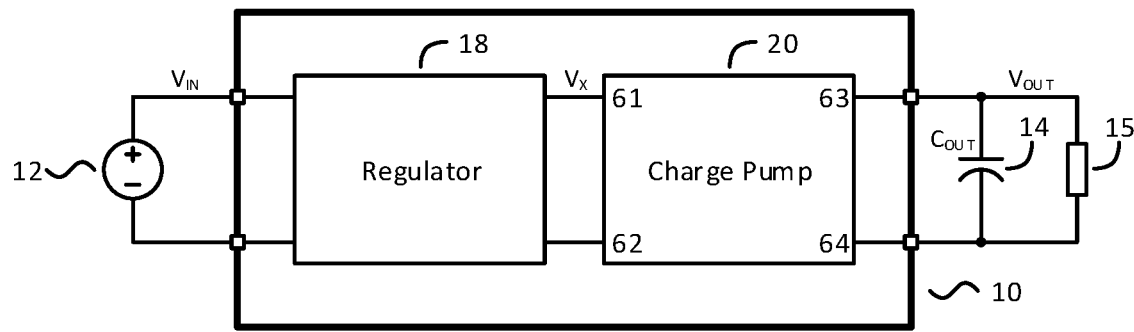
FIG. 1 shows a step-up power converter comprising a switched-capacitor network.

FIG. 1 shows a power converter 10. The power converter 10 receives an input voltage VIN provided by a voltage source 12, transforms it into an output voltage VOUT, and makes that output voltage VOUT available at an output capacitor 14 across which is connected a load 15. The power converter 10 is a step-up power converter. Accordingly, the output voltage VOUT exceeds the input voltage VIN. The power converter 10 includes a charge pump 20 and a regulator 18.

The power converter 10 is typically one of many components within a host device, or "host." A typical host may have a voltage source, such as a battery. However, the battery voltage may change over time. In addition, the host typically has different components with differing voltage requirements. It is therefore useful for a typical host to have some way to transform an available voltage into a desired voltage. The power converter 10 serves this purpose.

Figure 2:
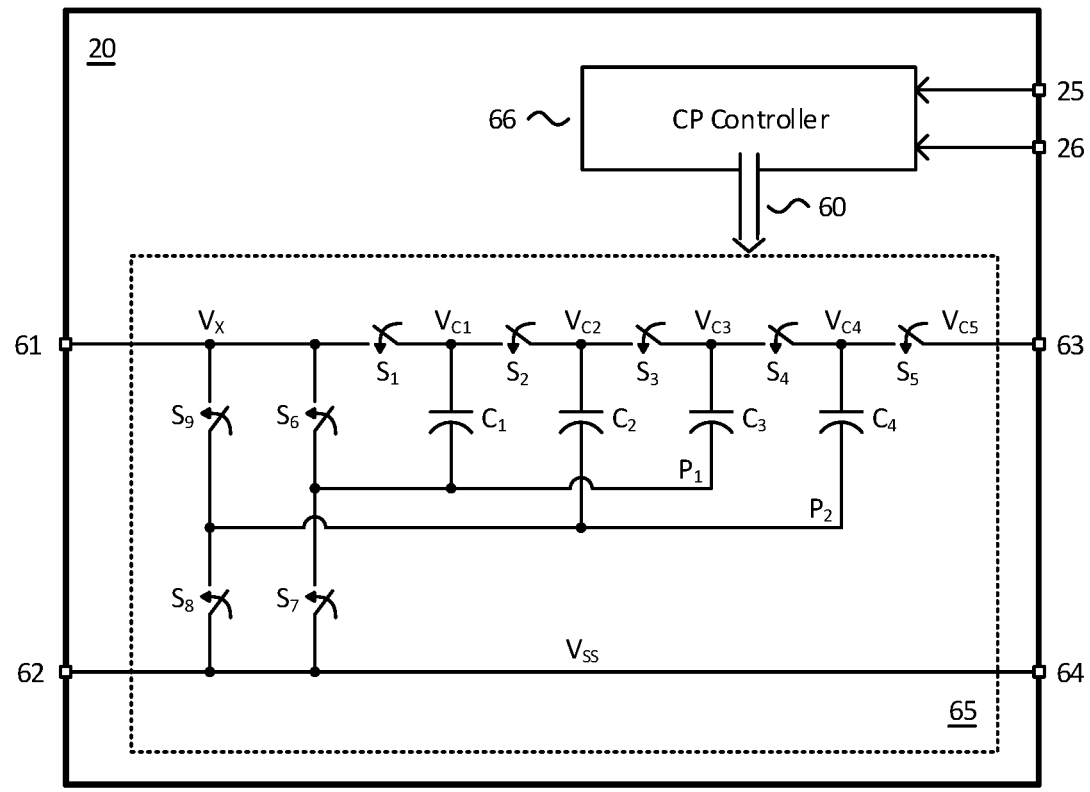
FIG. 2 shows details of the 1:5 step-up switched-capacitor network from the power converter shown in FIG. 1.

Referring now to FIG. 2, a charge pump 20 receives an input voltage across first and second charge-pump terminals 61, 62 and produces an output voltage across third and fourth charge-pump terminals 63, 64. The charge pump 20 includes a cascade multiplier 65 and a charge-pump controller 66. In the illustrated embodiment, the cascade multiplier 65 is a single-phase symmetric cascade multiplier.

The cascade multiplier 65 includes first, second, third, fourth, and fifth stack-switches S1, S2, S3, S4, S5. Of these, the first, third, and fifth stack-switches S1, S3, S5 define a set of "odd stack-switches" and the second and fourth stack-switches S2, S4 define a set of "even stack-switches."

The cascade multiplier 65 also includes first and second low-side phase switches S7, S8 as well first and second high-side phase switches S6, S9. The first and second low-side phase switches S7, S8 connect first and second phase nodes P1, P2 to a common node VSS that connects to the second and fourth charge-pump terminals 62, 64. The first and second high-side phase switches S6, S9 connect the first and second phase nodes P1, P2 to an input node VX that connects to the first charge-pump terminal 61. For convenience in discussing switching sequences, the first high-side phase switch S6 and the second low-side phase switch S8 will sometimes be referred to collectively as the "even phase-switches" and the first low-side phase switch S7 and the second high-side phase switch S9 will sometimes be referred collectively to as the "odd phase-switches."

The cascade multiplier 65 has four stages. The first stage includes the first stack-switch S1, a first stack-node VC1, and a first pump-capacitor C1; the second stage includes the second stack-switch S2, a second stack-node VC2 and a second pump-capacitor C2; the third stage includes the third stack-switch S3, a third stack-node VC3 and a third pump-capacitor C3; and the fourth stage includes the fourth stack-switch S4, a fourth stack-node VC4, and a fourth pump-capacitor C4.

In the embodiment shown in FIG. 2, the maximum voltage-transformation ratio is five because there are four stages. The fifth stack-switch S5 connects the fourth stage to a fifth stack-node VC5 that ultimately connects to the third charge-pump terminal 63. It is here that the power converter 10 maintains its output voltage VOUT.

The first pump-capacitor C1 connects the first phase-node P1 to the first stack-node VC1; the third pump capacitor C3 connects the first phase-node P1 to the third stack node VC3; the second pump capacitor C2 connects the second phase-node P2 to the second stack-node VC2; and the fourth pump capacitor C4 connects the second phase-node P2 to the fourth stack-node VC4.

In response to receiving one or more input signals at its first and second controller inputs 25, 26, a charge-pump controller 66 places control signals on a control-signal path 60. These control signals cause the first, second, third, fourth, and fifth stack-switches S1, S2, S3, S4, S5, the first and second low-side phase switches S7, S8, and the first and second high-side phase-switches S6, S9 to change states according to a specific sequence. As a result, the charge pump 20 repeatedly transitions between first and second operating-states at a specific frequency.

For example, during a first operating-state, the charge-pump controller 66 closes the odd stack-switches S1, S3, S5, the first low-side phase switch S7, and the second high-side phase switch S9 and opens the even stack-switches S2, S4, the first high-side phase switch S6, and the second low-side phase-switch S8. In contrast, during a second operating-state, the charge-pump controller 66 opens the odd stack-switches S1, S3, S5, the first low-side phase-switch S7, and the second high-side phase switch S9 and closes the even stack-switches S2, S4, the first high-side phase switch S6 and the second low-side phase-switch S8.

Figure 3:
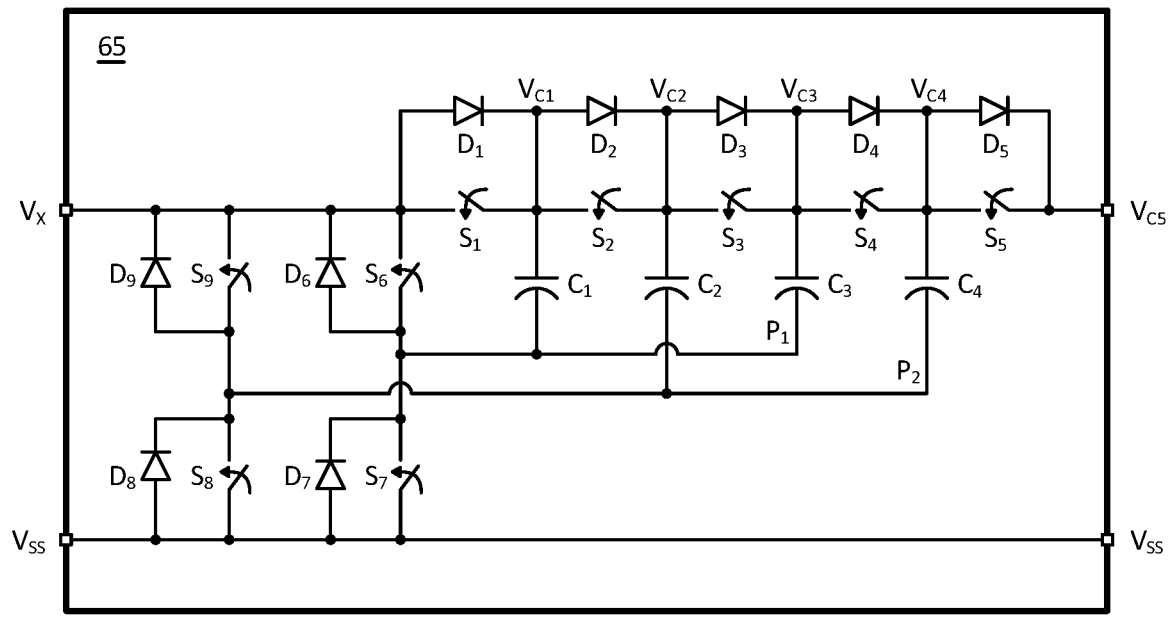
FIG. 3 shows the switched-capacitor network of FIG. 2 with transistor switch body-diodes shown.

FIG. 3 shows the cascade multiplier 65 within the charge pump 20 where first, second, third, fourth, and fifth stack-switches S1, S2, S3, S4, S5, the first and second high-side phase switches S6, S9, and the first and second low-side phase switches S7, S8 are implemented using MOSFET transistors.

Each MOSFET transistor has an inherent body-diode across its source and drain terminals. A first body-diode D1 is associated with the first stack-switch S1, a second body-diode D2 is associated with the second stack-switch S2, a third body-diode D3 is associated with the third stack-switch S3, a fourth body-diode D4 is associated with the fourth stack-switch S4, a fifth body-diode D5 is associated with the fifth stack-switch S5, a sixth body-diode D6 is associated with the first high-side phase-switch S6, a seventh body-diode D7 is associated with the first low-side phase-switch S7, an eighth body-diode D8 is associated with the second low-side phase-switch S8, and a ninth body-diode D9 is associated with the second high-side phase-switch S9.

A transistor can be made to function as a switch by using its gate terminal to cause the drain-source path to conduct or to not conduct. As used herein, "turning on" a transistor means to form a conducting channel between the transistor's source and drain. This is equivalent to closing a switch. The expression "turning off" a transistor means allowing the conducting channel to dissipate. This is equivalent to opening the switch.

Because of the presence and polarity of the first through fifth body-diodes D1, D2, D3, D4, D5, a forward electrical path exists from an input node VX to the fifth stack-node VC5 even when all the stack-switches S1-S5 have been opened. As a result, there will still be a voltage drop between the input node VX and the fifth stack-node VC5 even though all the stack-switches S1-S5 have been opened.

Each body-diode D1-D5 upstream of a stack-node VC1-VC5 diminishes the voltage at that stack-node VC1-VC5. For the first stack-node VC1, the loss of voltage is small because only the first body-diode D1 separates the first stack-node from input node VX. However, subsequent stack-nodes VC2-VC5 lose progressively more voltage as a result of the progressively greater number of upstream body-diodes. Depending on the magnitude of the voltage at input node VX, the forward voltage-drop across each body-diode, and the number of stack-nodes, the voltage at the stack-node furthest away from the input voltage may equal the lowest voltage VSS at the common-node VSS.

Some embodiments of a charge pump 20 rely on the voltage at a stack-node VC1-VC5 to open and close one or more stack-switches S1-S5 and to open and close one or more phase-switches S6-S9. This arrangement provides an efficient way to operate the charge pump 20. However, operation of such an embodiment presupposes the existence of an adequate voltage at each stack-node VC1-VC5. If even one stack-node has an inadequate voltage, the charge pump 20 will not operate correctly, and in fact, may not operate at all.

In general, the charge pump 20 will exist in one of three distinct states: the shutdown state, the steady state, and the start-up state.

During the steady state, the charge pump 20 receives an input voltage VIN and transforms it into an output voltage VOUT that is a multiple of its input. It is to be in this steady state that the charge pump 20 is manufactured in the first place. In the shutdown state, either no voltage is applied to the charge pump's input terminals 61, 62 or no positive differential exists across the input terminals 61, 62.

Between these two states is the start-up state. During the start-up state, a positive voltage difference is presented across the charge pump's input terminals 61, 62. However, there may not be an adequate voltage at each stack-node VC1-VC5 for the charge pump 20 to carry out its function. The methods and devices described herein are intended to reduce the length of this start-up state so that the charge pump 20 can promptly reach the steady-state, or to prevent the charge pump 20 from getting stuck in the start-up state indefinitely.

In steady-state operation, the charge pump 20 maintains enough charge within its internal capacitors so that those capacitors will have the necessary voltage for applying to the gates of those transistors that must be made to transition between conducting and non-conducting states. However, the start-up state poses a quandary.

When first starting up, these same internal capacitors may not have built up enough charge to produce a voltage that would be enough to guarantee that those same transistors can reliably be operated. Without the switches in operation, the charge in these internal capacitors will never be able to build up enough to generate the voltage that is needed to operate the very switches that must operate in order to build up that charge. This raises a "chicken or the egg" problem: the voltage source needed to operate the switches relies on the proper operation of those switches in order to produce the voltage that it needs to operate those switches in the first place. As a result, the charge pump 20 may never be able to attain steady-state operation.

In the case of a step-up power converter 10, the availability of adequate voltage at each stack-node VC1-VC5 is not a given, particularly at the beginning of the start-up state. This is because the input voltage VIN to the power converter may be the highest available voltage prior to operation and it is the job of the step-up power converter 10 to generate an output voltage VOUT that is higher than the input voltage VIN together with all other voltages within charge pump 20 that are necessary for operation.

To avoid this difficulty, it is useful to provide bypass paths that directly connect the input node VX to each stack-node VC1-VC5, thereby pre-charging the pump capacitor connected to each node. Each such bypass path bypasses one or more body-diodes D1-D5. These bypassed body-diodes therefore cannot cumulatively contribute to a voltage drop at that stack-node VC1-VC5.

Figure 4:
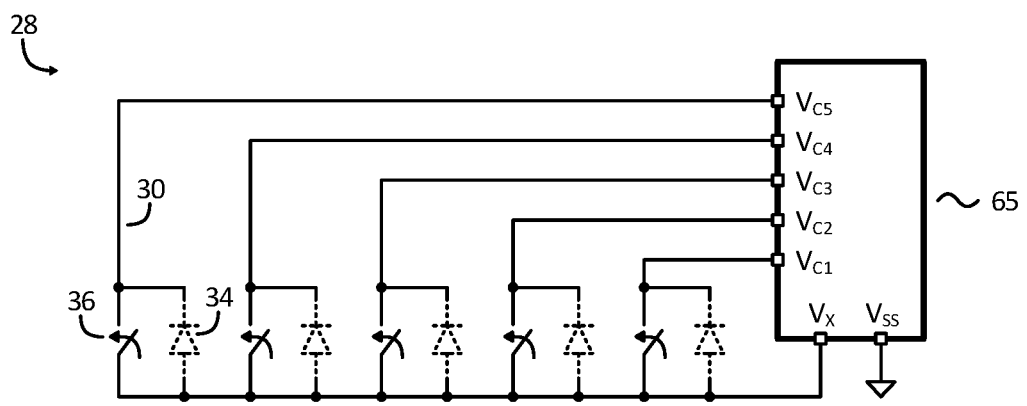
FIG. 4 shows an implementation of a first bypass-switch network where switches and/or diodes connect from the input to various stack nodes and the output.

In FIG. 4, a bypass array 28 implements one or more bypass paths 30. Each bypass path 30 bypasses one or more of the stack-switches S1-S4. In doing so, each bypass path 30 provides a direct connection between the input node VX and one of the stack-nodes VC1-VC4. The bypass array 28 also offers a bypass path 30 between the input node VX and the stack-node VC5 for pre-charging the output capacitor 14 in the power converter 10 of FIG. 1.

The bypass paths 30 are only active during the start-up state and only when the voltage at the input node VX exceeds that at the stack node VC1-VC5 to which it connects.

FIG. 4 shows two alternative implementations of the bypass array 28 superimposed on each other. A diode implementation of a bypass array 28 relies on bypass diodes 34 and a switch implementation of a bypass array 28 relies on bypass switches 36. The bypass diodes 34 are shown in dashed lines to indicate that they can represent an alternative to the bypass switches 36, which are shown in solid lines.

In the diode implementation, each bypass path 30 includes a bypass diode 34 whose cathode and anode are oriented to allow charge to flow from the input node VX towards a corresponding stack-node VC1, VC2, VC3, VC4, VC5 while simultaneously blocking current flow in the reverse direction from any stack-node VC1-VC5 towards the input node VX. As long as a stack-node VC1-VC5 lies below the voltage at input node VX, charge flows toward the stack-nodes VC1-VC5. In doing so, it bypasses all body-diodes D1-D5 upstream of it. This reduces the voltage drops along the stack-nodes VC1-VC5 and output node to just one diode-induced voltage-drop. Once the stack-node's voltage equals or exceeds the voltage at the input node VX, such forward charge flow ceases.

An advantage of the diode implementation lies in its simplicity. The bypass diode 34 automatically disables the bypass path 30 when necessary. No control circuitry is required. Nor is any circuitry required to sense the voltage so that a decision to disable the bypass path 30 can be made. On the other hand, a disadvantage of the first implementation is that the bypass diode 34 will extract its own voltage drop, just as a body-diode would. As a result, there is little benefit in including a bypass diode 34 in the bypass path 30 that leads to the first stack-node VC1.

In the switch implementation, a bypass switch 36 leading to a stack-node VC1-VC5 remains closed when the charge pump 20 is in the start-up state. During this start-up state, no switching occurs within the charge pump 20. The bypass switch 36 opens when charge pump 20 switching begins in the steady state.

The bypass switch 36 offers the advantage of reducing the diode-induced voltage drops that is inherent in the use of a bypass diode 34. However, it does so at the cost of additional complexity associated with circuitry needed for controlling each bypass switch 36.

When the charge pump 20 of FIG. 2 operates within a step-up power converter 10, the highest operating voltage at each stack-node increases successively by an integer multiple of the voltage at input node VX. For example, the highest operating voltage at the first stack-node VC1 is twice the voltage at the input node VX, the highest operating voltage at the second stack-node VC2 is three times the voltage at the input node VX, the highest operating voltage at the third stack-node VC3 is four times the voltage at the input node VX, and the highest operating voltage at the fourth stack-node VC4 is five times the voltage at the input node VX. Since the voltage-transformation ratio of the charge pump 20 shown in FIG. 2 is five, the voltage at the fifth stack-node VC5, which is also the charge pump's output node, is also approximately five times the voltage at its input node VX.

Because of the progressively higher voltages as one progresses down the stack nodes, the reverse-voltage ratings of each bypass diode 34 or bypass switch 36 will have to increase as well. Thus, a bypass diode 34 or a bypass switch 36 that connects to the $(n+1)^{th}$ stack-node VC(n+1) will be greater than that required for a bypass diode 34 or a bypass switch 36 that connects to an $n^{th}$ stack node VCn. Typically, as the reverse-voltage rating of a component increases, the die area required to build it increases. In addition, certain other parasitic effects, such as capacitance and leakage current, will tend to increase.

In FIG. 4, every stack-node VC1, VC2, VC3, VC4, VC5 has its own bypass path 30. However, this is not necessary. Different stack-nodes VC1-VC5 suffer from successively larger diode-induced voltage drops. In view of the phenomenon described above, it may be preferable to provide bypass paths 30 only to selected stack-nodes, such as those that suffer from the largest diode-induced voltage drops.

Figure 5:
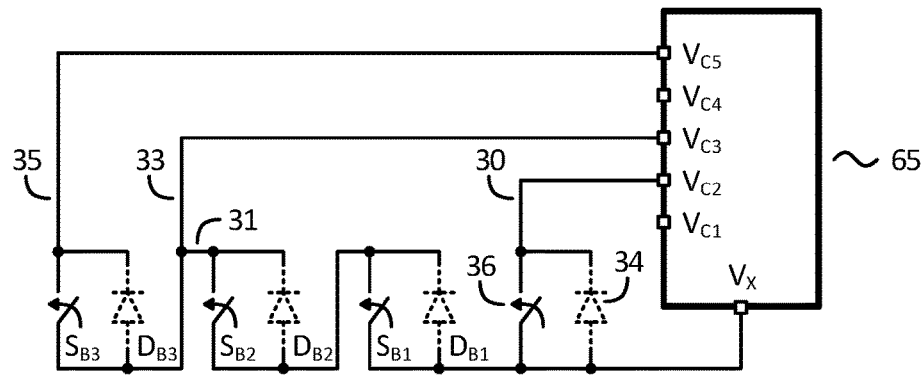
FIG. 5 shows an implementation of a second bypass-switch network where some of the switches and/or diodes connect between intermediate stack nodes.

FIG. 5 shows one such embodiment. The embodiment shown in FIG. 5 omits a bypass path to the first stack-node VC1 because the first stack-node VC1 does not sustain a significant enough voltage drop to make the additional bypass path to the first stack-node VC1 worthwhile in terms of die area or complexity.

Like FIG. 4, FIG. 5 shows two alternative implementations superimposed on each other. A first implementation of a bypass array 28 relies on bypass diodes 34 and a second implementation of a bypass array 28 relies on bypass switches 36. The bypass diodes 34 are shown in dashed lines to indicate that they can represent an alternative to the bypass switches 36, which are shown in solid lines.

The embodiment shown in FIG. 5 features a first bypass path 30 and a second bypass path 31. The first bypass path 30, which leads to the second stack-node VC2, includes a bypass diode 34 and/or a bypass switch 36. The second bypass path 31 bifurcates into first and second spurs 33, 35. The first spur 33 leads to the third stack-node VC3 and includes two series-connected bypass diodes DB1, DB2 and/or two series-connected bypass switches SB1, SB2. The second spur 35 includes a bypass diode DB3 and/or a bypass switch SB3 between the third stack-node VC3 and the fifth stack-node VC5, which is also the charge pump's output.

Of particular interest is the distribution of diodes along the second bypass path 31.

It can be seen that the second bypass path 31 features first and second series bypass diodes DB1, DB2 between the input node VX and the third stack-node VC3. This reduces the difference along the forward electrical path from the input node VX to the voltage at the third stack-node VC3 from three to two diode-induced voltage drops.

Although omitting a second bypass diode DB2 would save die area and reduce the voltage difference still further, the first bypass diode DB1 would then have to sustain the entire reverse voltage from the third stack-node VC3 to the input node VX during steady-state operation.

To avoid having a single diode sustain the entire reverse voltage, the embodiment shown in FIG. 5 uses the first and second series bypass diodes DB1, DB2 to split the reverse voltage across the two diodes. This allows bypass diodes with lower reverse-voltage ratings to be used.

In some cases, limitations in a manufacturing process make it difficult to make a diode that has a suitable high reverse-voltage rating. It is possible to circumvent such a limitation by using first and second series bypass diodes DB1, DB2 each of which has a smaller reverse-voltage rating. As a result, no one diode will have to endure the entire reverse voltage that arises during operation of the charge pump 20.

In some cases, even if the manufacturing process is capable of forming a diode with the required reverse-voltage rating, it is sometimes desirable to place bypass diodes in series anyway. For example, it is possible that the sum of the die areas consumed by two diodes with lower reverse-voltage ratings will be smaller than the die area consumed by a single diode having the required reverse-voltage rating.

In an alternative embodiment that relies on switches instead of diodes, a similar issue arises. This is addressed in an analogous way by providing first and second series bypass switches SB1, SB2 in series along the second bypass path 31 between the input node VX and the third stack-node VC3. By having a second bypass switch SB2 in series with the first bypass switch SB1, it becomes possible to divide the blocking-voltage between the first and second bypass switches SB1, SB2 instead of having the first bypass switch SB1 sustain the entire blocking-voltage. This potentially saves die area by using two smaller bypass switches, each with a lower reverse-voltage rating, than one larger switch with a reverse-voltage rating that is at least twice as high. The tradeoff, however, is the increased design complexity that arises from having to control two bypass switches instead of one.

The foregoing principle is applied again by having a third series bypass diode DB3 along the second spur 35. The required blocking-voltage difference between the fifth stack-node VC5 and the input node VX would be greater than that between the fifth stack-node VC5 and the third stack-node VC3. In the illustrated embodiment, the required blocking-voltage difference between the fifth stack-node VC5 and the input node VX would be four times the voltage at input node VX, whereas the required blocking-voltage difference between the fifth stack-node VC5 and the third stack-node VC3 would only be twice the voltage at input node VX. As such, it is possible to consume less die area by using first, second, and third series bypass diodes DB1, DB2, DB3 between the input node VX and the fifth stack-node VC5 to reduce the number of diode-induced voltage drops from five to three.

The same principle is at work in the second implementation that is shown in FIG. 5. In this second implementation, a third bypass switch SB3 lies along the second spur 35. The blocking-voltage difference between the fifth stack-node VC5 and its input node VX would be greater than that between the fifth stack-node VC5 and the third stack-node VC3. As such, it is possible to reduce the die area consumed by dividing the blocking-voltage difference across the first, second, and third bypass switches SB1, SB2, SB3.

In principle, it is also possible to have hybrid implementations in which some bypass paths 30, 32 use bypass diodes 34 and other paths use bypass switches 36. It is also possible for bypass switches 36 and bypass diodes 34 to coexist along the same bypass path. This is because the bypass switches 36 and bypass diodes 34 serve essentially the same purpose but simply achieve that purpose or function in different ways to achieve similar results.

Figure 6:
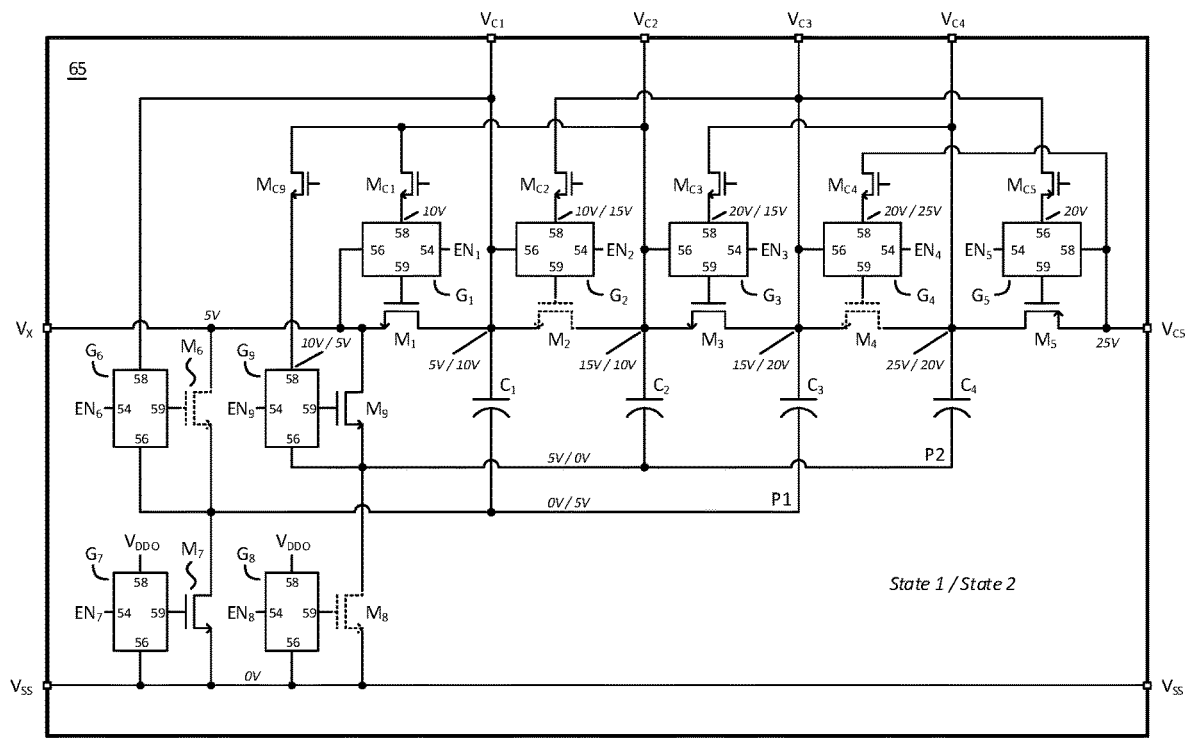
FIG. 6 shows the switched-capacitor network of FIG. 3 with switches implemented by transistors, each driven by a gate-drive block powered off various stack-nodes.

FIG. 6 shows an implementation of the cascade multiplier 65 shown in FIGS. 2 and 3 in which each of the first, second, third, fourth, and fifth stack-switches S1, S2, S3, S4, S5 is implemented using corresponding first, second, third, fourth, and fifth transistors M1, M2, M3, M4, M5 and in which each of the phase-switches S6, S7, S8, S9 is implemented using corresponding sixth, seventh, eight, and ninth transistors M6, M7, M8, M9. The fifth transistor M5 is a PMOS transistor whereas all other transistors are NMOS transistors.

It is possible to implement the fifth stack-switch S5 using an NMOS transistor. However, doing so requires greater design complexity than that required for a PMOS transistor. In addition, additional components will be required to drive the NMOS transistor. These components are not needed when a PMOS transistor is used.

The first, third, fifth, seventh, and ninth transistors M1, M3, M5, M7, M9 define a set of "odd transistors" and the second, fourth, sixth, and eighth transistors M2, M4, M5, M6, M8 define a set of "even transistors". During a first state of operation, only the odd transistors are made to conduct. During a second state of operation, only the even transistors are made to conduct. Steady-state operation of the charge pump 20 thereby involves switching back and forth between the first and second states of operation.

Beside each node shown in FIG. 6 is a pair of numbers in the form m/n. If a voltage of 5 volts is applied at the input node VX, then the voltage at that node will be m volts during the first state of operation and n volts during the second state of operation.

For example, during the first state of operation, the voltages at the first, second, third, and fourth stack-nodes VC1, VC2, VC3, VC4 are 5V, 15V, 15V, 25V respectively while the voltages at the first and second phase nodes P1, P2 are 0V and 5V respectively. Conversely during the second state of operation, the voltages at the first, second, third, and fourth stack-nodes VC1, VC2, VC3, VC4 are 10V, 10V, 20V, 20V respectively while the voltages at the first and second phase nodes P1, P2 are 5V and 0V respectively. The voltage at the fifth stack-node VC5 is 25V regardless of the state of operation. This is by design since the fifth stack-node is also the output node of the charge pump 20.

Figure 7:
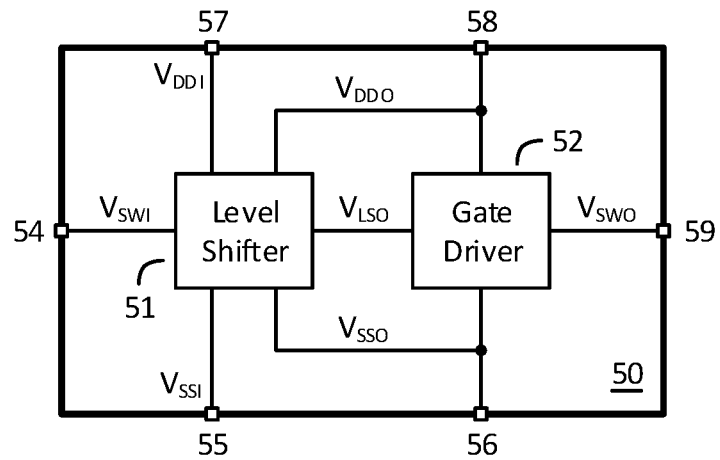
FIGS. 7-8 show an example of a gate-drive block and an implementation of a gate-driver.

FIG. 6 also shows first through ninth gate drives G1-G9, each of which connects to a gate terminal of whichever transistor it is intended to drive. FIG. 7 shows a gate-drive block 50 that is used to implement each one of the first through ninth gate drives G1-G9.

Referring now to FIG. 7, the gate-drive block 50 has a gate-driving terminal 59 that connects to the gate terminal of the transistors M1-M9 that is to be driven. As used herein, "driving" a transistor means causing the transistor's drain-to-source channel to transition between conducting and non-conducting states.

Each gate-drive block 50 has a gate-drive control-terminal 54. The gate-drive control-terminal 54 receives a signal that is intended to cause the transistor's drain-to-source channel to transition between conducting and non-conducting states. This signal is one of the control-signals EN1-EN9 that the charge-pump controller 66 placed on the control-signal path 60, as was discussed in connection with FIG. 2. These control-signals EN1-EN9 can be seen in FIG. 6.

In general, an electronic component responds to a difference between two voltages. It is customary to call the higher of the two voltages a "positive" voltage and the lower a "negative" voltage. Of course, this does not actually mean that one voltage is positive and the other is negative. This is because the actual numerical value of a voltage depends on an arbitrarily-defined reference voltage that is set equal to zero. Since it is only the difference that ultimately matters, it is useful to set the negative voltage to zero and call it "ground" or "Earth." This makes it possible to only discuss the positive voltage.

In some embodiments of the charge pump 20, different components may be presented with different negative voltages. In particular, the "ground" at a particular transistor may not correspond to the ground elsewhere in the circuit. To accommodate this, each gate-drive block 50 includes a level shifter 51 that converts a voltage difference into another voltage difference that is more appropriate for driving the transistors M1-M9.

The gate-drive block 50 shown in FIG. 7 includes first and second positive-supply terminals 57, 58 and first and second negative-supply terminals 55, 56. The first positive-supply terminal 57 receives a first positive-supply-voltage VDDI. The first negative-supply terminal 55 receives a first negative-supply-voltage VSSI. These can be seen in context in FIG. 6. The second positive-supply terminal 58 receives a second positive-supply-voltage VDDO. The second negative-supply terminal 56 receives a second negative-supply-voltage VSSO.

The gate-drive block 50 also includes a level shifter 51 and a gate driver 52. The level shifter 51 receives the first positive-supply-voltage VDDI, the first negative-supply-voltage VSSI, the second positive-supply-voltage VDDO, and the second negative-supply-voltage VSSO. The gate driver 52 receives only the second positive-supply-voltage VDDO and the second negative-supply-voltage VSSO.

The four supply voltages define a first supply-voltage difference and a second supply-voltage difference. The first supply-voltage difference is the difference between the first positive-supply-voltage VDDI and the first negative-supply-voltage VSSI. The second supply-voltage difference is the difference between the second positive-supply-voltage VDDO and the second negative-supply-voltage VSSO.

The level shifter 51 has a level-shifter logic-input that connects to the gate-drive control-terminal 54 to receive a first logic-signal VSWI. The level shifter 51 also has a level-shifter logic-output on which it places a second logic-signal VLSO that it generates.

The gate driver 52 has a gate-driver logic-input terminal that receives the second logic-signal VLSO from the level shifter 51. The gate driver 52 also has a gate-driver logic-output terminal on which it places a third logic-signal VSWO that it generates. It is this third logic-signal VSWO that connects to gate-driving terminal 59 and ultimately connects to the transistor's gate to drive the transistor.

In response to receiving a first logic-signal VSWI, logic within the level shifter 51 chooses between the first positive-supply-voltage VDDI and the first negative-supply-voltage VSSI. The level shifter 51 then translates the first logic-signal VSWI into the second logic-signal VLSO, which follows the logical polarity of the first logic-signal VSWI. This second logic-signal VLSO is provided to a gate-driver logic-input terminal, which in turn, causes the gate driver 52 to choose between the second positive-supply-voltage VDDO and the second negative-supply-voltage VSSO. The chosen one of these two voltages is what the gate driver 52 outputs as third logic-signal VSWO at the gate-driving terminal 59.

Figure 8:
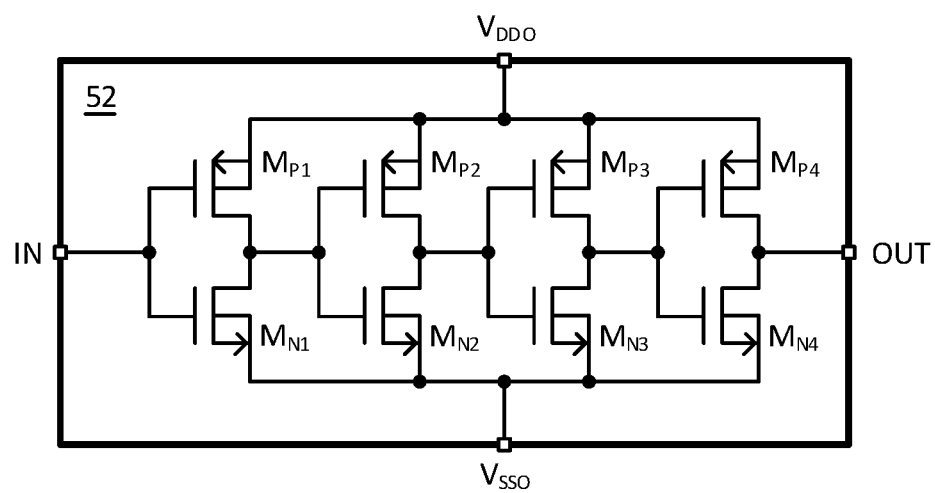

FIG. 8 shows details of the gate driver 52. The gate driver has a gate-driver logic-input IN and a gate-driver logic-output OUT. In the context of FIG. 7, the gate-driver logic-input IN is what receives the second logic-signal VLSO. The gate-driver logic-output OUT is what carries the third logic-signal VSWO.

First, second, third, and fourth inverters, in that order, couple the gate-driver logic-input IN to the gate-driver logic-output OUT. Each inverter includes a high-side PMOS transistor MP1-MP4 and a corresponding low-side NMOS transistor MN1-MN4. Due to the difference in electron and hole mobilities, each PMOS transistor MPn is typically larger than its corresponding NMOS transistor MNn.

The gate driver's four inverters are not all the same physical size. In particular, starting at the gate-driver logic-input IN, each subsequent inverter is k times larger than the previous inverter. For example, if k is equal to five and the width of the first inverter is one micron, then the widths of the second, third, and fourth inverters are five microns, twenty-five microns, and one hundred and twenty-five microns, respectively. By tapering the inverters in this way, it becomes possible for a small logic gate coupled to the gate-driver logic-input IN to drive a large power-transistor coupled to the gate-driver logic-output OUT.

To reduce the required die area and to promote power efficiency, it is desirable to use low-side NMOS transistors MN1-MN4 and high-side PMOS transistors MP1-MP4 that have a voltage rating equal to or close to the voltage rating across the gate and source terminals of the first through ninth transistors M1-M9 shown in FIG. 6. Assuming a 5V voltage-rating across the gate and source terminals of the first through ninth transistors M1-M9, then it would also be desirable to use 5V-rated transistors for the low-side NMOS transistors MN1-MN4 and the high-side PMOS transistors MP1-MP4 in the gate driver 52.

In general, the first positive-supply-voltage VDDI can be equal to, less than, or greater than the second positive-supply-voltage VDDO. Similarly, the first negative-supply-voltage VSSI can be equal to, less than or greater than the second negative-supply-voltage VSSO. In the example of FIG. 1 step-up power converter 10, the second positive-supply-voltage VDDO is typically greater than the first positive-supply-voltage VDDI and the second negative-supply-voltage VSSO is typically greater than the first negative-supply-voltage VSSI.

However, there is a constraint associated with the first and second supply-voltage differences. Neither the first supply-voltage difference nor the second supply-voltage difference should exceed the voltage rating of the transistors used in the circuitry powered between these terminals.

Referring to FIG. 6, the first through ninth gate drives G1-G9 all receive the same first positive-supply-voltage VDDI and the same first negative-supply-voltage VSSI The terminals through which these supply voltages are received have been omitted for clarity.

In general, the first through ninth gate drives G1-G9 will receive different second negative-supply-voltages VSSO. This is because the second negative-supply-voltage VSSO for a particular gate-drive G1-G9 comes from the source terminal of the particular transistor M1-M9 that it controls. This, in turn, also means that different gate drives G1-G9 will each receive different second positive-supply-voltage VDDO. This is because, to be able to use transistors with a desired voltage rating within the gate drives, the second supply-voltage difference, which is the difference between the second positive-supply-voltage VDDO and the second negative-supply voltage-VSSO, must not exceed the desired voltage rating. Therefore, if the second negative-supply-voltage VSSO varies, so too must the second positive-supply-voltage VDDO.

To promote power efficiency and to reduce the number of components required, it is useful to derive the second positive-supply-voltage VDDO for driving a transistor from one of the stack-nodes VC1-VC5 of the cascade multiplier 65 where possible. To achieve this, it is useful to provide a cascoding transistor MC1, MC2, MC3, MC4, MC5, MC9 along certain paths that connect a gate drive to a stack node VC1-VC5 to supply its second positive-supply-voltage VDDO. The paths that have a cascoding transistor MC1, MC2, MC3, MC4, MC5, MC9 are those where the voltage at the stack-node VC1-VC5 and the second negative-supply-voltage VSSO at each corresponding gate drive would exceed the desired transistor voltage-rating, which in the illustrated embodiment is five volts. To avoid having an excessive supply-voltage difference across a transistor being driven, a corresponding one of the cascoding transistors MC1-MC5, MC9 sustains the excess voltage between the stack-node and the second positive-supply-voltage VDDO at the corresponding gate drive to ensure that the supply-voltage difference is no greater than the desired voltage rating.

The second positive-supply-voltage VDDO for the seventh and eighth gate-drives G7, G8 can be provided by either the same voltage as the first positive-supply-voltage VDDI or by the input node VX. The choice depends on the value of the first positive-supply-voltage VDDI or the voltage available at the input node VX.

When the charge pump 20 is in steady-state operation, the transistors M1-M9 that implement the stack switches S1-S5 and the phase switches S6-S9 open and close in a synchronized pattern that pumps up the voltages at each stack node VC1-VC5. This ensures that there will be enough voltage at each stack node VC1-VC5 to power each gate-drive G1-G9 in order to drive the gates of all of the transistors.

When the charge pump 20 has a voltage applied or present at its input node VX before it begins to switch, the body-diodes between each adjacent pair of stack-nodes VC1-VC5 will nibble away at the stack-node voltages. Depending on the voltage at the input node VX relative to the magnitude of the forward voltage drop caused by each body-diode, it is quite possible that the body-diodes will nibble away enough voltage so that one or more of the stack-node voltages VC1-VC5 will prove inadequate for powering a gate-drive G1-G9 so that it can drive its corresponding transistor M1-M9. In fact, the second supply-voltage difference across each of the gate-drives G1-G9 may even start off as a negative voltage, thereby preventing any operation or control of the transistor gate whatsoever.

Certain transistors are, by virtue of their placement, less likely to find their operation hindered by these body voltage drops. For example, the seventh and eighth transistors M7, M8 have their second positive-supply-voltage VDDO provided by either the same voltage as the first positive-supply-voltage VDDI or the input node VX. As such, the seventh and eighth transistors M7, M8 will not suffer from a diode-induced voltage drop.

A charge pump 20 that has just started to operate relies heavily on the phase-switches S6-S9 to pump up the voltages on the stack-nodes VC1-VC5. This is because the phase-switches S6-S9 play a significant role in controlling the voltage at the phase-nodes P1, P2, each connecting to the bottom terminal of a pump capacitor C1-C4, as shown in FIG. 2. The first and second high-side phase-switches S6, S9 connect the phase-nodes P1, P2 to the input node VX. The low-side phase-switches S7, S8 connect the phase-nodes P1, P2 to the common-node VSS. The first and second high-side phase-switches S6, S9 are complementary to the low-side phase-switches S7, S8. When one of the two phase-nodes P1, P2 connects to ground, the pump capacitors connected to that phase node charge. When one of the two phase nodes P1, P2 connects to input node VX, the pump capacitors connected to that phase node discharge while simultaneously increasing the voltage on stack-nodes connected to the top of these pump capacitors.

Referring to the particular implementation shown in FIG. 6, the seventh and eighth transistors M7, M8 that implement the low-side phase-switches S7, S8 are controllable immediately at the start of the charge pump switching because the seventh and eighth gate-drives G7, G8 are powered by a second positive-supply-voltage VDDO that is either the same voltage as the first positive-supply-voltage VDDI or the voltage at the input node VX.

The operation described above assumes that the second positive-supply-voltage VDDO is sufficient at the start of the charge pump switching to guarantee proper operation of the seventh and eighth gate-drives G7, G8. This is less likely to be true of the second positive-supply-voltages provided to the sixth and ninth gate-drives G6, G9 that control the sixth and ninth transistors M6, M9 that implement the high-side phase-switches S6, S9.

For instance, the first stack-node VC1 provides the second positive-supply-voltage for the sixth gate-drive G6 while the second stack-node VC2 provides the second positive-supply-voltage for the ninth gate-drive G9, which has a cascoding transistor MC9 between itself and its source of voltage, namely the second stack-node VC2. Prior to the charge pump 20 operation or while the charge pump 20 is shutdown, the second positive-supply-voltage VDDO available for the ninth gate-drive G9 is likely to be lower than the second positive-supply-voltage VDDO available for the sixth gate-drive G6. This is because of the additional diode-induced voltage drop at the second stack-node VC2 compared to the first stack-node VC1. This may inhibit the ability of the ninth transistor M9 to be controlled in a manner that is synchronized relative to the other phase-switches M6, M7, M8. This may delay or even prevent the startup of the charge pump 20.

Figure 9:
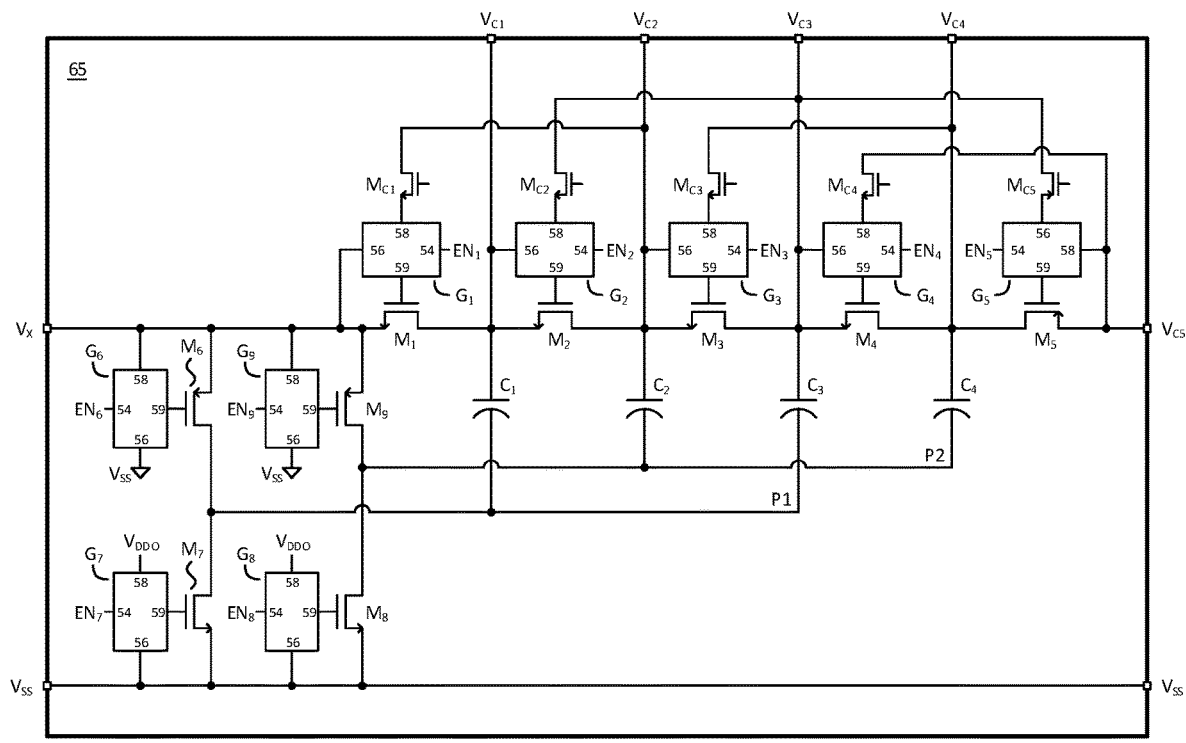
FIG. 9 shows the switched-capacitor network of FIG. 6 with an alternate P-type transistor implementation for the high-side phase switches.

FIG. 9 shows an alternate implementation of the cascade multiplier 65 of FIG. 6 in which the sixth and ninth transistors M6, M9, which implement the high-side phase-switches S6, S9, are PMOS instead of NMOS. Using PMOS instead of NMOS transistors changes the biasing requirements for the second positive-supply-voltage VDDO and the second negative-supply-voltage VSSO at the sixth and ninth gate-drives G6, G9. For both the sixth and ninth gate-drives G6, G9, the second positive-supply-voltage connects directly to the input node VX without requiring a cascoding transistor in series. In addition, for both the sixth and ninth gate drivers G6, G9, the second negative-supply-voltage connects to the common-node VSS. This means the second supply-voltage difference at the sixth and ninth gate-drives G6, G9 is no longer diminished by diode-induced voltage drops along the stack-nodes VC1 and VC2. However, this approach consumes more die area and degrades power efficiency because PMOS transistors have a larger on-resistance for a given size than NMOS transistors.

Figure 10:
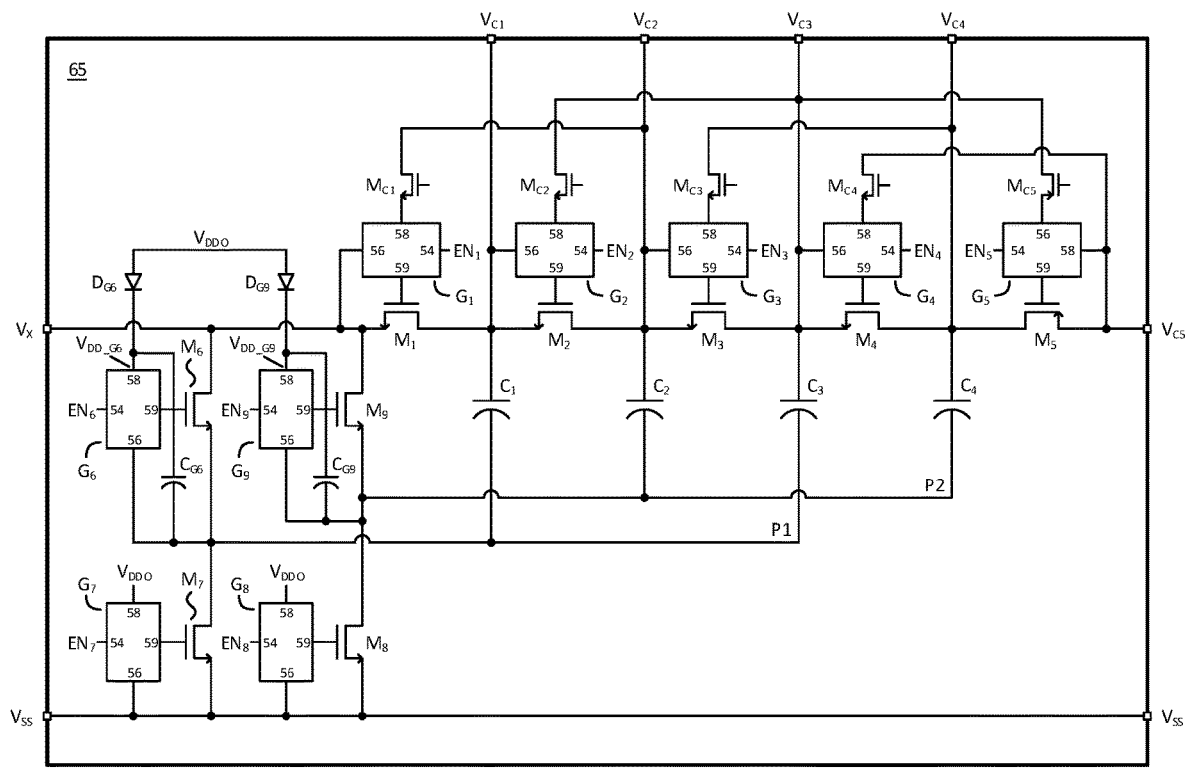
FIG. 10 shows the switched-capacitor network of FIG. 6 with an alternate biasing scheme for the gate-drives controlling the high-side phase-switches.

FIG. 10 shows an alternate implementation of the cascade multiplier 65 of FIG. 6 in which the sixth and ninth gate-drives G6, G9, which control the NMOS transistors M6, M9 that implement the high-side phase-switches S6, S9 are powered differently. This embodiment shares certain features with that shown in FIG. 6. Notably, the first positive-supply-voltage VDDI and first negative-supply-voltage VSSI as well as the connection of the second negative-supply-voltage VSSO to the source terminal of the corresponding sixth and ninth transistors M6, M9 remain the same as that shown in FIG. 6.

A difference arises in the second positive-supply-voltage for the sixth and ninth gate-drives G6, G9. The second positive-supply-voltage for the sixth gate-drive G6, labeled VDD_G6, is now derived from the anode of a first bootstrap-capacitor CG6 that is refreshed by a first bootstrap-diode DG6 from the same second positive-supply-voltage VDDO at the seventh and eighth gate-drives G7, G8. Likewise, the second positive-supply-voltage for the ninth gate-drive G9, labeled VDD_G9, is now derived from the anode of a second bootstrap-capacitor CG9 that is refreshed by a second bootstrap-diode DG9 from the same second positive-supply-voltage VDDO at the seventh and eighth gate-drives G7, G8. The first and second bootstrap-diodes DG6, DG9 can also be implemented using PMOS transistors that are controlled in a manner such that they only allow current to flow towards the bootstrap-capacitors CG6, CG9. In this embodiment, the PMOS transistors behave like diodes and the cascoding transistor MC9 is no longer needed.

As was the case in FIG. 6, the second positive-supply-voltage VDDO at the seventh and eighth gate-drives G7, G8 can be provided by either the same voltage as the first positive-supply-voltage VDDI or the input node VX depending on the voltage levels available at VDDI or input node VX.

An advantage of the implementation shown in FIG. 10 is that of ensuring a higher second supply-voltage difference, especially at the ninth gate-drive G9, before the switches in the charge pump begin switching. This is accomplished by matching the second supply-voltage difference at the ninth gate-drive G9 with that at the sixth gate-drive G6.

Implementing the bootstrap-diodes DG6, DG9 using PMOS transistors further increases the second supply-voltage difference at the sixth and ninth gate-drives G6, G9. This implementation does so by eliminating a diode-induced voltage drop between the second positive-supply-voltage VDDO and both the second positive-supply-voltage for the sixth gate-drive G6 (VDD_G6) and the second positive-supply voltage for the ninth gate drive G9 (VDD_G9). This ensures that both the low-side phase-switches S7, S8 and the high-side phase switches S6, S9 are able to switch properly right from the start of the charge pump's operation.

Figure 11:
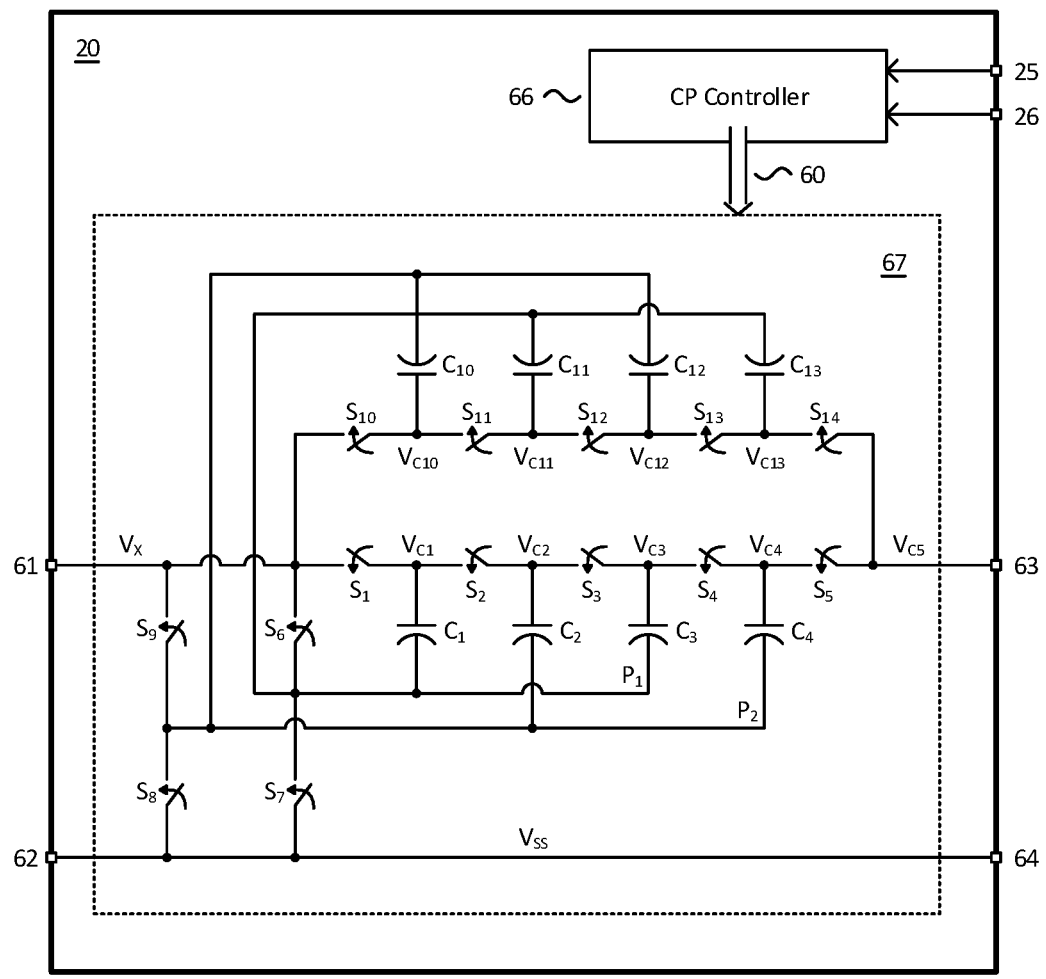
FIG. 11 shows a dual-phase 1:5 step-up switched-capacitor network from the power converter shown in FIG. 1.

Another solution to matching the second supply-voltage difference at the ninth gate-drive G9 is that of using a dual-phase symmetric cascade multiplier 67 within the charge pump 20, as shown in FIG. 11.

In FIG. 11, the first phase of the dual-phase symmetric cascade multiplier 67 comprises the same stack-switches S1-S5, phase-switches S6-S9, stack-nodes VC1-VC4, and pump capacitors C1-C4 as the cascade multiplier 65 in FIG. 2. The second phase of the dual-phase symmetric cascade multiplier 67 duplicates the four stages of the first phase where each stage in the second phase includes one of the pump capacitors C10-C13 and one of four corresponding stack-switches S10-S13. The first stage in the second phase includes the stack-switch S10, a stack-node VC10 and a pump capacitor C10; the second stage in the second phase includes the stack-switch S11, the stack-node VC11, and the pump capacitor C11; the third stage in the second phase includes the stack-switch S12, the stack-node VC12 and the pump capacitor C12; and the fourth stage in the second phase includes the stack-switch S13, the stack-node VC13 and the pump capacitor C13. The stack-switch S14 connects the fourth stage in the second phase to a fifth stack-node VC5 that connects to the third charge-pump terminal 63. Both the first phase and second phase of the dual-phase symmetric cascade multiplier 67 share the same phase switches S6-S9 and phase nodes P1, P2.

In response to receiving first and/or second controller inputs 25, 26, a charge-pump controller 66 places control-signals on a control-signal path 60. These control-signals cause the stack-switches S1, S2, S3, S4, S5, S10, S11, S12, S13, S14 and the phase-switches S6-S9 to change states according to a specific sequence. As a result, the charge pump 20 repeatedly transitions between first and second operating-states at a specific frequency.

For example, during a first operating-state, the charge-pump controller 66 closes the odd stack-switches S1, S3, S5, S11, S13 and the odd phase-switches S7, S9 and opens the even stack-switches S2, S4, S10, S12, S14 and the even phase-switches S6, S8. In contrast, during a second operating-state, the charge-pump controller 66 opens the odd stack-switches S1, S3, S5, S11, S13 and the odd phase-switches S7, S9 and closes the even stack-switches S2, S4, S10, S12, S14 and the even phase-switches S6, S8. During steady-state operation, the first stack-node VC1 switches between the same two voltage levels but out of phase with the stack-node VC10. This behavior is also true for the second stack-node VC2 and the stack-node VC11, the third stack-node VC3 and the stack-node VC12, fourth stack-node VC4 and stack-node VC13.

FIG. 6 shows an implementation of the first phase in the dual-phase symmetric cascade multiplier 67 with transistors implementing each stack-switch and phase-switch, and the gate-drives controlling each transistor. The second phase in the dual-phase symmetric cascade multiplier 67 is implemented the same way as the first phase as shown in FIG. 6, especially in terms of the stack-switches S10-S14 and their corresponding gate-drives, while sharing the same transistor phase-switches M6-M9 and gate-drives G6-G9 as the first phase.

The dual-phase symmetric cascade multiplier 67 matches the second supply-voltage difference at the ninth gate-drive G9 with the second supply-voltage difference at the sixth gate-drive G6. This can be accomplished by connecting the second positive-supply-voltage of the ninth gate-drive G9 directly to the stack-node VC10, which conveniently switches in phase with the second phase node P2 while staying above the voltage at the second phase node P2 by an amount equal to the voltage at the input node VX. Furthermore, this implementation also eliminates the need for the cascoding transistor MC9 together with bootstrap-diodes and bootstrap-capacitors.

At the completion of the charge pump's startup, the charge pump 20 will have raised the voltages at its stack nodes VC1-VC5 from a voltage that is less than or equal to that presented at the input node VX to the much higher voltages associated with steady-state operation. In particular, the average voltage across each pump capacitor C1-C4 increases to a multiple of the voltage at the input node VX. For example, the average voltage across the first pump capacitor C1 is roughly equal to the average voltage at the input node VX, the average voltage across the second pump capacitor C2 is roughly twice the voltage at the input node VX, the average voltage across the third pump capacitor C3 is roughly equal to three times the voltage at the input node VX, and the average voltage across the fourth pump capacitor C4 is roughly equal to four times the voltage at the input node VX.

The phase-switches S6-S9 can be made to operate correctly at the start of charge pump 20 switching using the methods previously described. This is especially important when the gate-drive for the phase-switches S6-S9 are derived from the stack-nodes VC1-VC5. The same is not necessarily true for the stack-switches S1-S5 when implemented using transistors and gate-drives as shown in FIG. 6. This is because the body-diode of each transistor that is between adjacent pair of stack-nodes VC1-VC5 will nibble away at the stack-node voltages. Depending on the voltage at the input node VX relative to the magnitude of each body-diode's forward voltage, it is quite possible that the body-diodes will nibble away enough voltage so that one or more of the stack-node voltages VC1-VC5 will prove inadequate for providing enough voltage for a gate-drive G1-G5 to reliably drive its corresponding stack-switch transistor M1-M5. Consequently, the stack-switch transistors M1-M5 are most likely open at the start of the charge pump switching and remain so for several switching cycles thereafter until the second supply-voltage difference across the gate-drives G1-G5 goes from negative to a level that is sufficiently positive for the stack-switch transistors M1-M5 to begin reliably transitioning between conducting and non-conducting states in response to their corresponding control-signals EN1-EN5.

Since the stack-switch transistors M1-M5 will be inoperative when the charge pump 20 is first starting up, it is necessary to provide an interim path to raise the stack-node voltages VC1-VC5 in lieu of the stack-switch transistors M1-M5. The existence of such an interim path can be deduced from FIG. 3's cascade multiplier 65, in which body-diodes D1-D9 are shown in parallel with each corresponding switch S1-S9 that is implemented as a transistor. Because of these body-diodes D1-D9, it is still possible to start up and eventually operate the charge pump 20 even if all stack-switches S1-S5 are open. This is because the transfer of charge from the input node VX through the pump capacitors C1-C4 to the charge-pump's output can still take place through the body-diodes D1-D5.

Although the use of this interim path results in poorer efficiency and a less accurate output voltage, it is enough to raise the voltages at the stack nodes VC1-VC5 so that the stack-switch transistors M1-M5 can eventually take over. It is primarily this interim path through the body-diodes D1-D5 of the stack-switch transistors M1-M5 that the charge pump 20 relies on during startup while waiting for the voltages at the stack-nodes VC1-VC5 to rise sufficiently to power the gate-drives G1-G5 so that the stack-switch transistors M1-M5 can begin switching properly.

Startup of the charge pump 20 involves raising the voltages at the stack-nodes VC1-VC5 so that they transition from a first range of voltages to a second range of voltages. When the voltages at the stack-nodes VC1-VC5 are in the first range, they are too low to even come close to turning on any stack-switch transistors M1-M5. Thus, although they are unable to do anything useful, they can at least do no harm. In the second range, the voltages at stack-nodes VC1-VC5 have risen to the point at which they can reliably open and close stack-switch transistors M1-M5 on demand.

However, in order to go from the first range to the second range, the voltages at the stack-nodes VC1-VC5 must pass through a third range that lies in between. Passage through the third range is fraught with danger. These voltages are sometimes just barely high enough to operate a stack-switch transistor M1-M5 or to do so reliably, with proper timing or propagation delays.

There is little harm when larger-than-expected propagation delay through a gate-drive block 50 delays the closing of a stack-switch. However, a delay in opening a switch creates the possibility of shoot-through event. In a shoot-through event, two stack-switches that should never be closed at the same time are temporarily closed at the same time.

As an example, consider a charge pump 20 that transitions from a first operating state to a second operating state. In the first operating state, the stack-switches S1, S3, S5 and the phase-switches S7, S9 are closed while the stack-switches S2, S4 and the phase-switches S6, S8 are open. In the second operating state, the stack-switches S1, S3, S5 and the phase-switches S7, S9 are open while the stack-switches S2, S4 and the phase-switches S6, S8 are closed. Assume that this transition occurs at startup when the voltage on the second stack-node VC2, which powers the gate-drive G1, is enough to operate the stack-switch transistor M1 that implements the stack-switch S1, but just barely so. As a result, the propagation delays associated with causing the transistor to transition between conducting and non-conducting states are much slower than expected.

As a result of this barely adequate voltage, the transistor will operate. But it will do so sluggishly. This transistor will be able to change state as required. However, it may not always do so on cue.

During the first operating state, the stack-node VC1 couples to the input node VX and the first phase node P1 couples to the common-node VSS while the stack-node VC2 is pumped above the stack-node VC1 since the second phase node P2 couples to input node VX. Upon transitioning from a first operating state to a second operating state, the second phase node P2 couples to the common-node VSS while the first phase node P1 couples to the input node VX. The intention is for stack-node VC1 to be pumped above input node VX while coupling to stack-node VC2.

Despite having insufficient voltage on the stack-node VC3 to power the second gate-drive G2 and to turn on stack-switch transistor M2 that implements stack-switch S2, the first stack-node VC1 may still indirectly couple to the second stack-node VC2 through the body-diode D2 of the second stack-switch transistor M2. At the same time, a slow propagation delay through the gate-drive G1 may cause the first stack-switch transistor M1 to remain conducting while the first stack-node VC1 has already begun to couple to the second stack-node VC2. This sets the stage for a shoot-through event.

As a result of this timing error, the first stack-node VC1 couples to both the input node VX and to the stack-node VC2 at the same time while the first phase node P1 also couples to the input node VX at the start of the second operating state. This immediately discharges the first pump capacitor C1. It also prevents the remaining pump capacitors C2-C4 from ever charging their proper voltage multiples above that of the input node VX. As a result, the charge pump 20 may remain stuck close to its initial state. Depending on the severity of the timing errors, the charge pump 20 may undergo an extended delay before finally reaching steady-state operation. Or, the charge pump 20 may never be able to reach steady-state operation.

The scenario described above is not the only fallout from timing errors. Other undesirable outcomes are possible whenever the gate-drives misbehave or operate with incorrect timing due to an inadequate second supply-voltage difference. It is therefore desirable to prevent a stack switch from operating until it is truly ready to do so.

Figure 12:
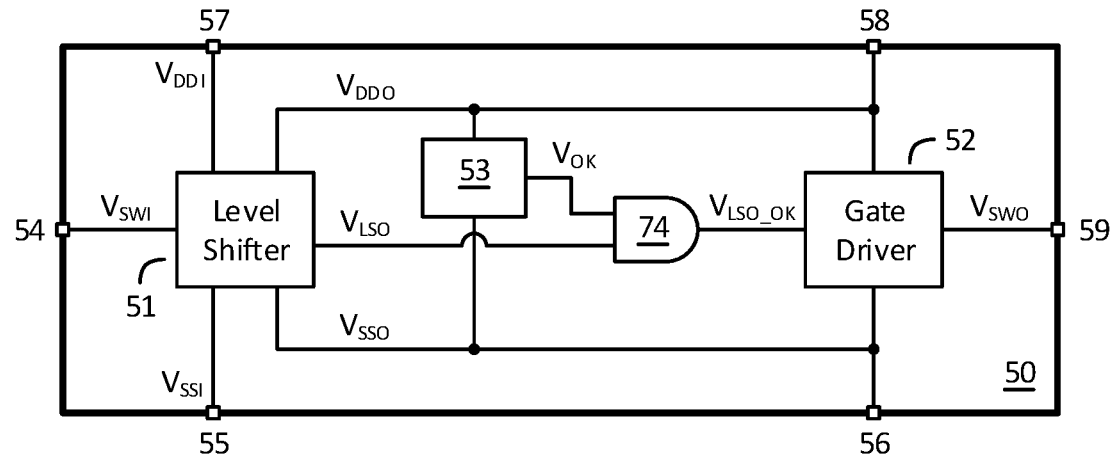
FIGS. 12-13 show an example of a gate-drive block with an under-voltage lockout, and an implementation of the under-voltage lockout.

One method for avoiding the foregoing difficulties is to delay or prevent each gate-drive block 50 from turning on its corresponding stack-switch transistor until a sufficient second supply-voltage difference has been detected. FIG. 12 shows an implementation of a gate-drive block 50 having circuitry to suppress premature switching. The illustrated gate-drive block 50 is similar to that shown in FIG. 7 but with the addition of an under-voltage lockout 53 and an AND-gate 74 between the level-shifter 51 and the gate-driver 52.

The AND-gate 74 receives, as inputs, both the second logic-signal VLSO at the output of the level-shifter 51 and a fourth logic-signal VOK from the under-voltage lockout 53. The AND-gate's logic output presents a fifth logic-signal VLSO_OK that intervenes so that the only time the level-shifter 51 can cause the gate-driver 52 to set a third logic-signal VSWO to a value that will drive the switch at all is when the under-voltage lockout 53 grants permission to do so via the fourth logic-signal VOK. The under-voltage lockout 53 will do so only when it considers the switch to be ready to carry out its function. It does so using circuitry shown in FIG. 13.

Figure 13:
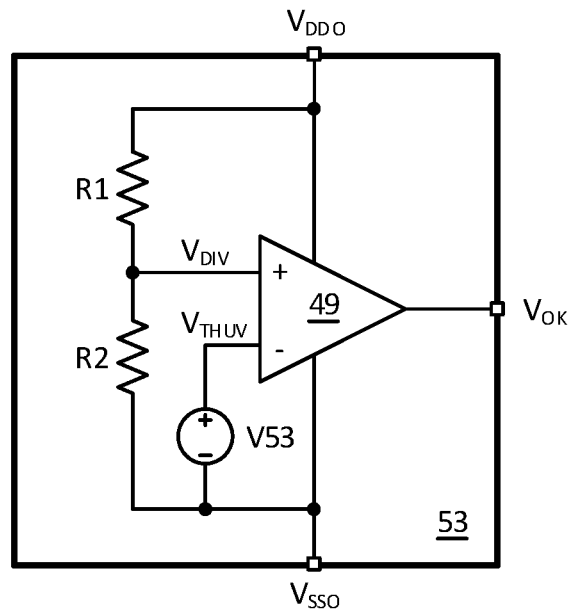

Referring now to FIG. 13, the under-voltage lockout 53 features a voltage comparator 49 powered by a voltage difference between the second positive-supply-voltage VDDO and the second negative-supply-voltage VSSO.

A first comparator input connects to a tap voltage VDIV that lies between first and second resistors R1, R2. The voltage across the first and second resistors R1, R2 is equal to the second supply-voltage difference. The tap voltage VDIV is therefore a fraction of the second supply-voltage difference. A second comparator input connects to a threshold-voltage source V53 that generates a threshold voltage VTHUV. The voltage comparator 49 compares the first and second comparator inputs and generates a fourth logic-signal VOK only if the tap voltage VDIV is greater than the threshold voltage VTHUV. This fourth logic-signal VOK is what tells the gate-driver block 50 that the switch is now ready to be driven.

Other possible implementations for the under-voltage lockout 53 include connecting the first comparator input directly to the second positive-supply-voltage VDDO or using a band-gap circuit in place of the threshold-voltage source V53 to generate the threshold voltage VTHUV. Yet another implementation for the under-voltage lockout 53 relies on a skewed inverter instead of voltage comparator 49.

The use of bypass paths as described above is not the only mechanism for reducing the time it takes to start-up the power converter 10.

Figure 14:
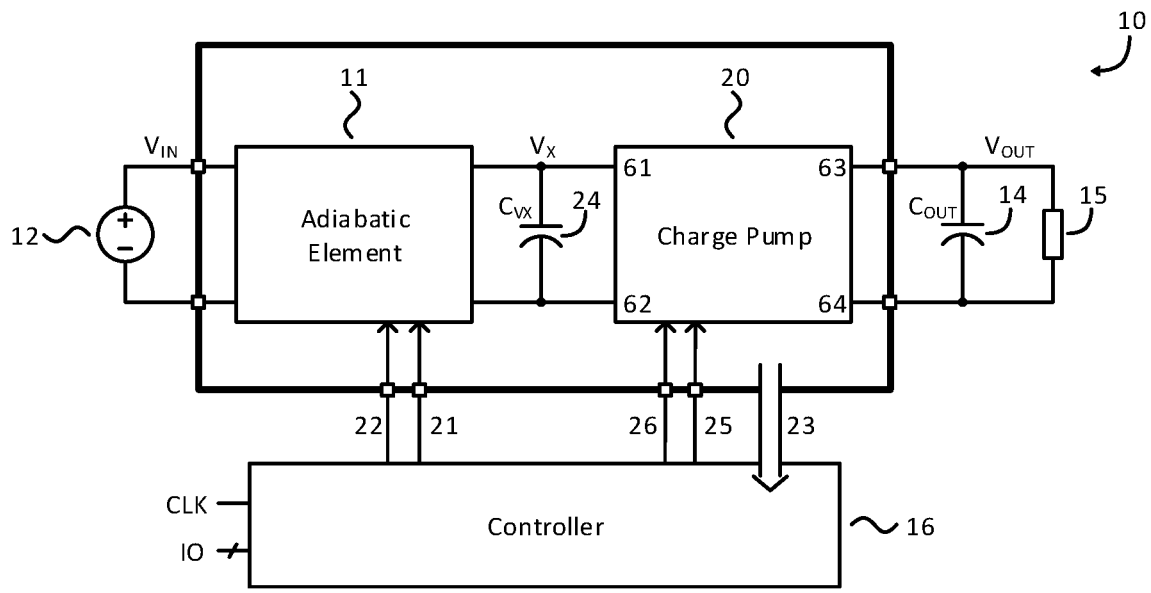
FIG. 14 shows a step-up power converter comprising a switched-capacitor network and an adiabatic element.

An alternative embodiment, shown in FIG. 14, features a power converter 10 that receives an input voltage VIN provided by a voltage source 12 and transforms it into an output voltage VOUT at an output capacitor 14 across which is connected a load 15. The power converter 10 includes a controller 16, a charge pump 20, and an adiabatic element 11 in series between the voltage source 12 and the charge pump 20.

The adiabatic element 11 receives the input voltage VIN, generates an intermediate voltage VX across an intermediate capacitor 24, and then provides that intermediate voltage VX to the charge pump 20. The charge pump 20 then transforms the intermediate voltage VX into an output voltage VOUT that is higher than the input voltage VIN. The inclusion of the adiabatic element 11 allows the charge pump 20 to charge adiabatically.

The controller 16 receives a set of input signals and produces a set of output signals. Some of these input signals arrive along an input-signal path 23. These input signals carry information that is indicative of the power converter's operation. The controller 16 also receives a clock signal CLK and external signals IO that are either analog, digital, or a combination of both. Based upon the signals that the controller 16 receives, it produces first, second, third, and fourth control signals 25, 26, 21, 22 that together control the operation of the adiabatic element 11 and the charge pump 20.

Other examples of charge pumps 20 include Ladder, Dickson, Series-Parallel, Fibonacci, and Doubler, all of which can be adiabatically charged and configured into multi-phase or single-phase networks. A particularly useful charge pump 20 is an adiabatically charged version of a full-wave cascade multiplier. However, diabatically charged versions can also be used.

As used herein, changing the charge on a capacitor "adiabatically" means causing at least some of the charge stored in that capacitor to change by passing it through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an adiabatically charged switching network is a switching network having at least one capacitor that is both adiabatically charged and adiabatically discharged. A diabatically charged switching network is a switching network that is not an adiabatically charged switching network.

Figure 15:
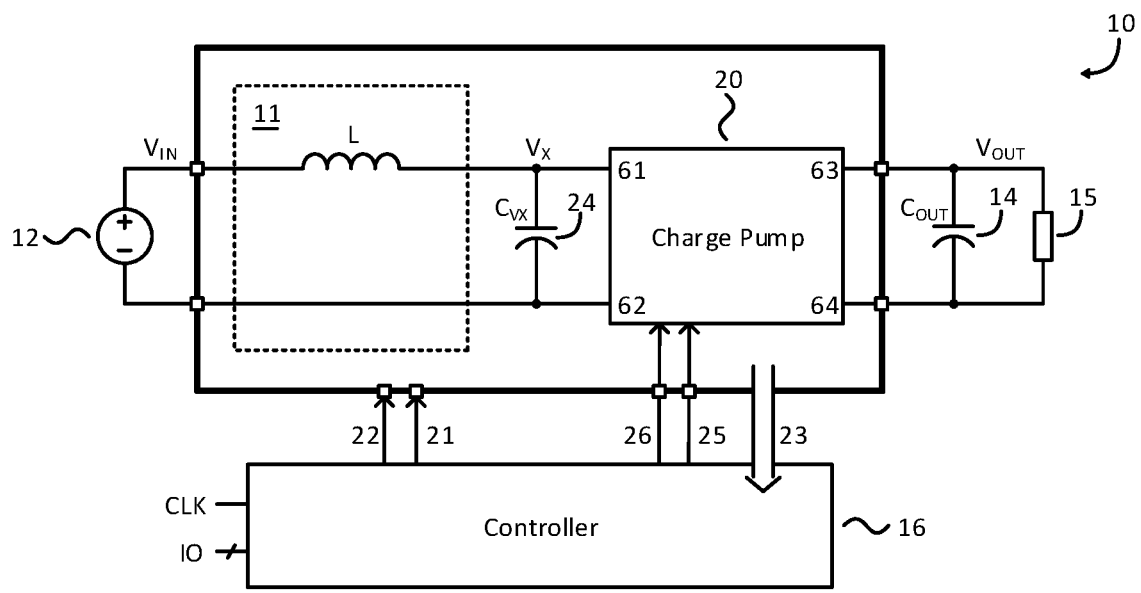
FIG. 15 shows a first example of the FIG. 14 power converter where the adiabatic element comprises an inductor.
Figure 16:
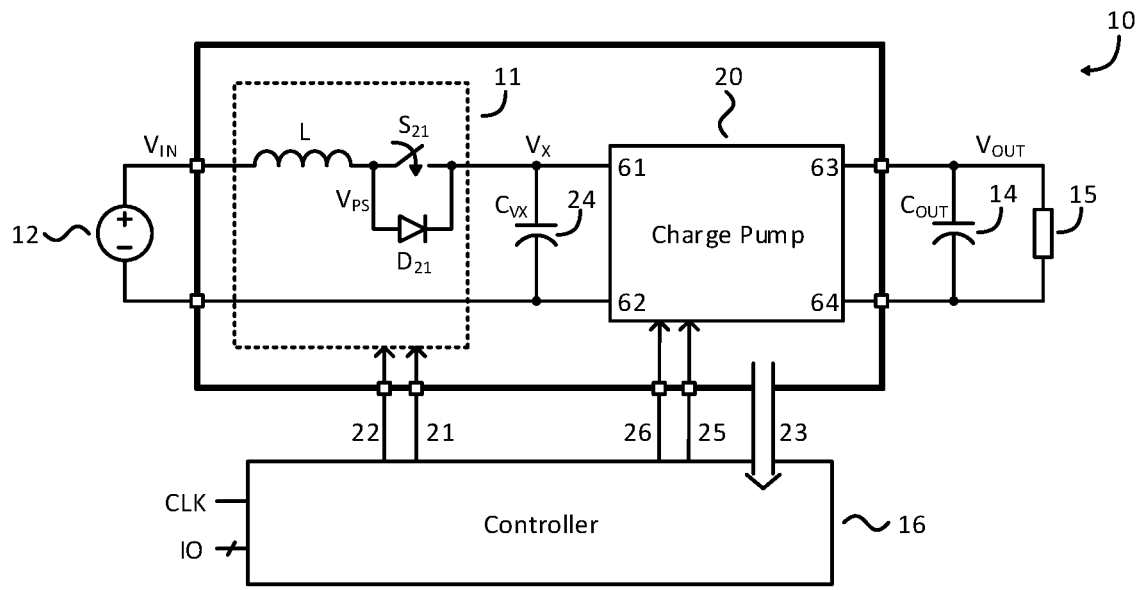
FIG. 16 shows a second example of the FIG. 14 power converter where the adiabatic element comprises an inductor, a switch and/or a diode.

FIGS. 15 and 16 show particular implementations of the adiabatic element 11 within the context of the step-up power converter 10 shown in FIG. 14.

In FIG. 15, the adiabatic element 11 comprises an inductor L. In this example, the third and fourth control signals 21, 22 from controller 16 are not used. In a shutdown state, when the charge pump 20 neither operates nor switches, the intermediate voltage VX across an intermediate capacitor 24 is equal to the input voltage VIN provided by voltage source 12.

In FIG. 16, the adiabatic element 11 comprises an inductor L and a current-blocking element that blocks current in one direction but allows it to flow in the other direction. The inductor L connects between the input voltage VIN and a node VPS. The current-blocking element connects between the node VPS and the intermediate voltage VX received by the charge pump 20.

Some embodiments implement the current-blocking element as a priming diode D21 that is oriented to permit current to flow towards the charge pump 20 but to block current that flows away from the charge pump 20.

Other embodiments implement the current-blocking element as a priming switch S21 that mimics the operation of the priming diode D21. Such a switch closes to permit forward current flow through the inductor L towards the charge pump 20 and opens to prevent reverse current flow away from the charge pump 20. In these embodiments, a third control signal 21 from the controller 16 controls the priming switch S21.

While either the priming diode D21 or priming switch S21 can be implemented in FIG. 16, the priming diode D21 offers the advantage of not requiring separate control circuitry. On the other hand, the priming switch S21 does not introduce as large a forward voltage drop as does the priming diode D21. In some embodiments, the priming switch S21 and the priming diode D21 can both be present and configured to cooperate.

Having the priming switch S21 or the priming diode D21 allows the intermediate voltage VX to be equal to or substantially higher than the input voltage VIN. Having an intermediate voltage VX that is higher than the input voltage VIN can be particularly useful prior to the start of the charge pump 20 switching.

One advantage to having a higher intermediate voltage VX is that such a voltage can be used to prime the stack-nodes VC1-VC5 so that each stack-node VC1-VC5 begins charge pump operation with a head start on its voltage. As a result of this head start, even when the voltage across a stack-node VC1-VC5 has been nibbled away by its upstream body-diodes D1-D5, enough residual voltage will remain to reduce the delay associated with the onset of correct stack-switch activity when the charge pump 20 begins operation.

Some embodiments pump up the intermediate voltage VX to further promote the ability to prime the stack nodes VC1-VC5 prior to charge pump 20 operation. This can be carried out by increasing the slew rate or rise time of the input voltage VIN when voltage source 12 first supplies the power converter 10.

In FIGS. 15-16, the inductor L and the intermediate capacitor 24 form an LC filter with a time constant $\tau$ proportional to the square root of the inductance and capacitance. A slew rate at the input voltage VIN that is approximately equal to or less than the time constant $\tau$ induces a large forward current through the inductor L. This, in turn, causes the intermediate voltage VX to surge past the input voltage VIN. This phenomenon will be referred to herein as "overcharging" of the intermediate capacitor VX.

In the case of FIG. 15, the intermediate voltage VX will subsequently ring or oscillate in a sinusoidal manner around an average voltage equal to the input voltage VIN as the induced current through the inductor L settles back to around zero. Eventually, the magnitude of the oscillations will subside and the intermediate voltage VX will equal the input voltage VIN.

In FIG. 16, it is possible to permit only forward current flow. This can be done passively, in the case of the priming diode D21, or actively, in the case of the priming switch S21. In either case, the result is a positive voltage rectification at the intermediate voltage VX in response to a similar slew rate at input voltage VIN.

The first half of the sinusoidal oscillation at the intermediate voltage VX follows that of FIG. 15, but with a diminution in voltage that is caused by either the inherent forward-voltage drop across the priming diode D21 or the smaller voltage drop inherent across the priming switch S21. The second half of the sinusoidal oscillation does not follow that in FIG. 15. On the contrary, it disappears.

The disappearance of the second half of the sinusoidal oscillation arises from having provided either the priming diode D21 or the priming switch S21 to block reverse current flow.

By allowing forward current and then blocking reverse current, the priming diode D21 or the priming switch S21 effectively captures a surge of charge brought in by the initial voltage overshoot that occurs at the intermediate voltage VX in response to a slew rate at input voltage VIN. The intermediate capacitor 24 stores this captured charge and uses it to prop up the voltages on the stack-nodes VC1-VC5.

It should be noted that most hosts that use a power converter 10 do not give the power converter 10 any say in the slew rate or rise time of the input voltage VIN. Most such hosts will simply supply an input voltage and expect the power converter 10 to do whatever needs to be done to startup and provide a stable output voltage.

Depending on the nature of the host, the input voltage VIN may originate from a battery, a USB-powered rail, a DC output of an AC adapter, an output of another power converter, a solar panel, or anywhere else. In general, the power converter 10 will have no control over the slew rate at which an input voltage is being presented to it. Therefore, the power converter 10 should be able to startup and operate regardless of the slew rate associated with which the input voltage VIN is presented to the power converter 10.

If the input voltage VIN is presented with a slew rate that is much slower than the time constant τ of the equivalent LC filter shown in FIG. 16, it will be insufficient to prime the stack-nodes VC1-VC5. This is because a slow slew rate at input voltage VIN allows the intermediate voltage VX to follow the input voltage VIN closely. This, in turn, minimizes the voltage difference across the inductor L and thus prevents an induced forward current from being large enough to overcharge the intermediate voltage VX. As a result, the intermediate voltage VX will fail to surge past the input voltage VIN and then oscillate as a decaying sinusoid as it would have had the input voltage VIN been presented with a fast slew rate. Instead, the intermediate voltage VX simply tracks the slowly-rising input voltage VIN but with its amplitude decreased by a voltage drop that results from current having passed through either the priming diode D21 or the priming switch S21.

Therefore, it is desirable to prime the intermediate voltage VX and the voltages at the stack-nodes VC1-VC5 in a way that is independent of how the input voltage VIN is provided and how fast it rises initially.

Referring to FIG. 16 again, one solution involves initially opening the priming switch S21 to block all current flow through the inductor L. After detecting a non-zero input voltage VIN at the power converter's input, the priming switch S21 closes, thereby introducing an immediate voltage difference across the inductor L and allowing forward current to flow. This forward current flows from the power converter's input terminal through inductor L and towards the charge pump's input. Eventually the forward current's magnitude decays to zero and starts to grow in the negative direction. This is the reverse current flow. Upon detecting reverse current flow, or alternatively, upon lapse of an appropriate interval, the priming switch S21 opens. As a result, the priming switch S21 blocks reverse current flow, which would otherwise reduce the intermediate voltage VX. At this point, the intermediate voltage VX and the stack-node voltages should be primed and the charge pump 20 can begin operating in steady-state mode. The introduction of an immediate voltage difference across the inductor L upon closing the priming switch S21 is akin to the application of a fast slew rate at input voltage VIN.

Figure 17:
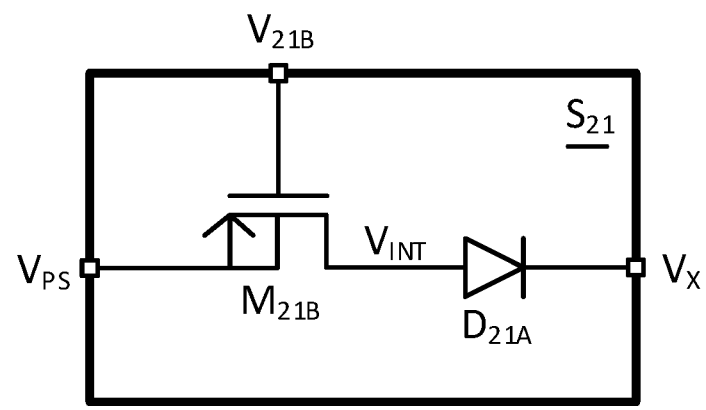
FIG. 17 shows an implementation of a priming-switch in the FIG. 16 adiabatic element.

FIG. 17 shows circuitry that can implement the priming function of the priming switch S21.

The priming switch S21 has a first switch-terminal VPS and a second switch-terminal VX. Between these terminals is a PMOS transistor M21B having a source-to-drain path and a series diode D21A along the source-to-drain path.

The PMOS transistor's drain and source terminals connect so that the PMOS-transistor's body-diode connects with its cathode to the inductor L at the first switch-terminal VPS and connects with its anode to the series diode D21A. It is also possible to use an NMOS transistor instead of the PMOS transistor M21B as long as the NMOS transistor's body-diode has the orientation as described above.

When both forward and reverse current flow through the inductor L is to be blocked at the beginning of power converter 10 startup, the priming switch S21 is opened by floating a gate-voltage V21B or by connecting the gate-voltage V21B to the first node VPS, essentially shorting the gate and source terminals of PMOS transistor M21B.

After having detected a non-zero input voltage VIN at the power converter's input, the priming switch S21 closes to allow forward current flow. One way to close the priming switch S21 is to set a threshold below the voltage at the first node VPS and to then bias the gate-voltage V21B so that it remains below this threshold. With the priming switch S21 thus closed, the source-to-drain path conducts. This requires that the gate-source voltage rating of the PMOS transistor M21B not be exceeded. The series diode D21A eventually blocks reverse current flow through the inductor L while the PMOS transistor M21B remains conducting throughout charge pump operation.

Other implementations of the priming switch S21 that comprise only switches and no diodes are possible at the expense of more complex circuitry to control each switch.

Another solution to priming the intermediate voltage VX and the stack-node voltages VC1, VC2, VC3, VC4, VC5 in a way that is independent of how the input voltage VIN is provided and how fast it initially rises avoids the design complexity and additional die area used to make the priming switch S21 shown in FIG. 17. This solution relies on using the low-side phase-switches S7, S8 within the charge pump 20 as priming-switches prior to the start of charge pump switching.

Shutting down the charge pump 20 parks all switches in their open positions. The startup sequence for the charge pump 20 begins with closing both of the low-side phase-switches S7, S8 for some duration before switching the odd stack-switches S1, S3, S5 and the odd phase-switches S7, S9 out of phase with the even stack-switches S2, S4 and the even phase-switches S6, S8. The act of closing both the low-side phase-switches S7, S8 for the first time at startup causes the pump capacitors C1-C4 to charge for the first time. This charge initially comes from the intermediate capacitor 24.

If the intermediate capacitor 24 is large, it will have plenty of charge available for charging the pump capacitors C1-C4. This means that the voltage across the intermediate capacitor 24 will not change very much. As a result, the intermediate voltage VX will stay relatively constant.

On the other hand, if the intermediate capacitor 24 has only a small capacitance relative to the pump capacitors C1-C4, it will not have enough charge available for charging the pump capacitors C1-C4 for the first time. This means that as the pump capacitors C1-C4 draw charge from the intermediate capacitor 24, they rapidly exhaust the intermediate capacitor's supply of charge. Since the voltage across a capacitor depends on how much charge is on it, this sudden loss of charge on the intermediate capacitor 24 causes the intermediate voltage VX to collapse.

The collapse of the intermediate voltage VX creates a sudden voltage difference across the inductor L. Because the current through an inductor is the time integral of the voltage across it, the sudden appearance of this voltage difference induces an increasing forward current in the inductor L, an effect akin to that of applying an input voltage VIN with a fast slew rate to the power converter 10 shown in FIG. 16.

This induced current flows in a forward direction through the inductor L, through the priming diode D21, and towards the charge pump 20. Some of this current replenishes the supply of charge in the intermediate capacitor 24, thus restoring the intermediate voltage VX across the intermediate capacitor 24. Some of it continues into the charge pump 20 where it charges the pump capacitors C1-C4.

As the intermediate voltage VX builds back up, the voltage difference across the inductor L will decrease. Therefore, the time integral of the voltage difference will also decrease. As a result, the induced forward current through inductor L begins to decrease until it eventually reaches zero.

The magnitude of the induced forward current depends on the value of the inductor L, the input voltage VIN, and the relative values of the intermediate capacitor 24 and the pump capacitors C1-C4. This magnitude can initially be quite high. In fact, this induced forward current can initially be high enough to temporarily raise the intermediate voltage VX even higher than the input voltage VIN. This is exactly what is required to raise the stack-node voltages VC1, VC2, VC3, VC4, VC5.

It is apparent therefore that by purposefully making the intermediate capacitor 24 inadequate to supply all of the charge needed to prime the stack-node voltages, it is possible to make available considerable current from which the pump capacitors C1-C4 can take all the charge that they need.

The use of an intermediate capacitor 24 of inadequate size also has a synergistic effect during steady state operation by promoting adiabatic charging and discharging of the pump capacitors C1-C4. This may help increase the power efficiency of the charge pump 20.

This priming method is simpler than adding or making the priming switch S21 since it takes advantage of the existing low-side phase-switches S7, S8 within the charge pump 20 without the need for additional devices. Furthermore, the modification necessary for the control-signals EN7, EN8 to perform the priming function prior to charge pump's operation is relatively simple.

As previously described in FIG. 2 and FIG. 6, a charge-pump controller 66 places control-signals EN1-EN9 on a control-signal path 60 to cause the stack-switches S1-S5 and the phase-switches S6-S9 to change states according to a specific sequence. The charge-pump controller 66 does so in response to receiving a first control signal 25 and second control signal 26 sent from controller 16, as shown in FIG. 16. One possible implementation is for the first control signal 25 to control the low-side phase-switches S7, S8 as priming-switches until the second control signal 26 is activated to enable charge pump 20 switching.

A limitation of the foregoing methods is that they prime or overcharge the intermediate voltage VX and the stack-node voltages VC1, VC2, VC3, VC4, VC5 in a highly application-dependent manner. For instance, the amount of voltage overcharge depends on the inductance of the inductor L, the capacitances of the pump capacitors C1-C4, the input voltage VIN, and the switch resistances. In some cases, the amount of voltage overcharge can exceed the voltage ratings of the transistors used to implement the charge pump switches. This is particularly true at higher magnitudes of the input voltage VIN where coincidentally, the need for priming also decreases.

Figure 18:
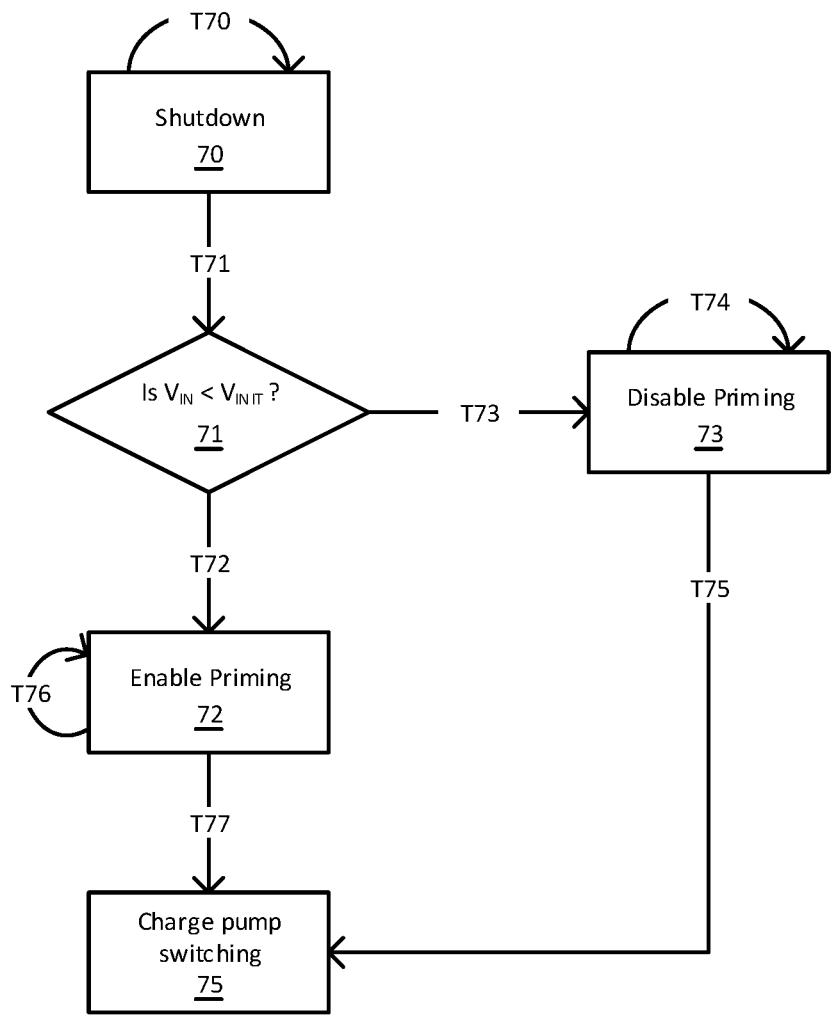
FIG. 18 shows state transitions for controlling one or more priming-switches prior to charge pump operation.

FIG. 18 shows state transitions that can be implemented in the controller 16 using some or all of the signals received along the input-signal path 23 when the power controller 10 starts from a shutdown state 70. The controller 16 implements each state transition by sending first and second control signals 25, 26 to the charge pump 20.

When the power converter 10 is in a shutdown state 70, it can either remain in the shutdown state 70 or transition into a first decision-state 71 depending on other state machine inputs. These other state machine inputs include, for example, whether the power converter 10 has been enabled or disabled, and whether there are any existing faults.

In the presence of an input indicating a fault or an input indicating that the power converter 10 should remain disabled, the controller 16 executes a state transition T70 in which the power converter 10 remains in the shutdown state 70. If instead there is an enable input and an absence of faults, the controller 16 transitions from the shutdown state 70 to a first decision-state 71 by executing a state transition T71.

During the first decision-state 71, the controller 16 compares the magnitude of the input voltage VIN with a priming-threshold voltage VINIT. In some embodiments, it does so using a voltage comparator within the controller 16. If the input voltage VIN is lower than the priming-threshold voltage VINIT, then priming will be necessary.

Assuming that priming has been deemed to be necessary, the controller 16 then transitions from the first decision-state 71 to an enable-priming state 72 by executing a state transition T72. In the enable-priming state 72, the controller 16 sends control signals for causing the appropriate priming procedure to be carried out. In some embodiments, this includes closing the transistor M21B of the priming switch S21. In other embodiments, this includes closing the low-side phase-switches S7, S8.

Eventually, after a predetermined time interval or after the priming is completed, the controller 16 transitions from the enable-priming state 72 to an operation-state 75 by executing a state transition T77. In the operation-state 75, the controller 16 operates the charge pump 20 according to its steady-state sequence.

Conversely, if, during the first decision-state 71, the controller 16 determines that the input voltage VIN is higher than the priming-threshold voltage VINIT, then the controller 16 transitions from the first decision-state 71 to a disable-priming state 73 by executing a state transition T73. In this state, the controller 16 disables priming to avoid overcharging the intermediate voltage VX and raising the stack-node voltages VC1, VC2, VC3, VC4, VC5 above their transistor voltage ratings.

Eventually after a predetermined duration or after the pump capacitors C1-C4 are sufficiently charged, the controller 16 transitions from the disable-priming state 73 to the operation-state 75 by executing a state transition T75. During the operation state, the controller 16 causes the charge pump 20 to operate in its steady state.

In both the enable-priming state 72 and the disable-priming state 73, the pump capacitors C1-C4 are charged for the first time since exiting the shutdown state 70. The key difference between the enable-priming state 72 and the disable-priming state 73 lies in the charging rate, which determines whether or not the intermediate voltage VX and the stack-node voltages VC1, VC2, VC3, VC4, VC5 get over-charged or primed above the input voltage VIN. The enable-priming state 72 over-charges or primes by inducing a large forward current through the inductor L. By comparison, the disable-priming state 73 avoids over-charging by not inducing a large forward current through the inductor L.

One way to disable priming is to reduce the slew rate of the input voltage VIN Another way to do so is to bypass those components within the power converter 10 that may act like priming switches or, in the alternative, to at least control them so that they do not act like priming-switches. In one example, the adiabatic element 11 shown in FIG. 16 can be made to behave like the adiabatic element 11 in FIG. 15 by closing the priming switch S21 throughout the disable-priming state 73 while permitting both forward and reverse inductor current flow.

As previously described for the power converter 10 of FIG. 16, closing the low-side phase-switches S7, S8 in the presence of a non-zero input voltage VIN promotes priming when the priming diode D21 is connected and blocks reverse current flow. It is thus necessary to close these switches in a way that avoids having them inadvertently promote priming of the stack nodes.

One way to close the low-side phase-switches S7, S8 without promoting priming of the stack nodes VC1-VC4 is to close them before the input voltage VIN has been provided or even during the absence of the input voltage VIN. This step avoids priming the intermediate voltage VX.

However, closing the low-side phase-switches S7, S8 in the absence of an input voltage VIN may not always be possible, especially when the first and second positive-supply-voltages VDDI, VDDO are derived from the input voltage VIN as well. Also, advance knowledge of whether the input voltage VIN to be provided is higher or lower than the priming-threshold voltage VINIT becomes necessary, yet impractical to obtain.

Another approach to implementing the disable-priming state 73 is to weaken the switch's ability to act as a priming-switch. For example, when closing low-side phase-switches S7, S8 in the presence of a non-zero input voltage VIN, it is possible to control the act of closing in a manner that limits the current flow through the switches S7, S8, thereby also limiting the induced current flow through the inductor L and the rate at which the pump capacitors C1-C4 charge. This current-limiting or current-controlled approach to closing the low-side phase-switches S7, S8 can be implemented several ways.

In the embodiment shown in FIG. 6, the seventh and eighth transistors M7, M8 implement the low-side phase-switches S7, S8. The seventh and eighth gate-drives G7, G8 drive the seventh and eighth transistors M7, M8 in response to control-signals EN7, EN8 that undergo a voltage translation from a first positive-supply-voltage VDDI and a first negative-supply-voltage VSSI to a second positive-supply-voltage VDDO and a second negative-supply-voltage VSS.

In some embodiments, the second positive-supply-voltage VDDO can be the same as the first positive-supply-voltage VDDI or the intermediate voltage VX. However, it is also possible to take advantage of an independent source that provides a second positive-supply-voltage VDDO to implement a current-limited closing of the seventh and eighth transistors M7, M8.

One approach relies on the effect of gate voltage on a transistor's conducting channel. At low enough gate voltages, a transistor's conducting channel will become smaller, and hence more resistive. This, in turn, reduces the current passing through. Thus, an alternative way to control the transistor current is to start with a low second positive-supply-voltage VDDO for driving the seventh and eighth transistors M7, M8 and to gradually increase that voltage to a higher level throughout the duration of the disable-priming state 73.

Another approach relies on having seventh and eighth transistors M7, M8 that have multiple conducting channels that are in parallel and that can be individually controlled. This is not unusual for power FETs. In that case, by allowing some but not all of these channels to conduct during the disable-priming state 73, it is possible to increase the overall resistance and thus reduce the incoming current to avoid priming.

A related approach is to have higher-resistance transistors in parallel with the seventh and eighth transistors M7, M8. These higher-resistance transistors would be turned on during the disable-priming state 73 while the seventh and eighth transistors M7, M8 remain turned off. At the end of the disable-priming state 73, the seventh and eighth transistors M7, M8 will take over so that a low resistance channel can prevail.

The aforementioned methods for current-limited closing of the low-side phase-switches S7, S8 can also be used for the priming switch S21. More complex methods of controlling the switch current while closing may involve using current-sense amplifiers or regulators that monitor either the transistor current or the inductor current and adjusting the transistor gate voltage accordingly.

Another approach to priming the intermediate voltage VX and the stack-node voltages VC1, VC2, VC3, VC4, VC5 is available when the adiabatic element 11 is an inductor-based regulator. In that case, the inductor-based regulator can itself be used to prime the intermediate voltage VX and the stack-node voltages VC1, VC2, VC3, VC4, VC5.

Figure 19:
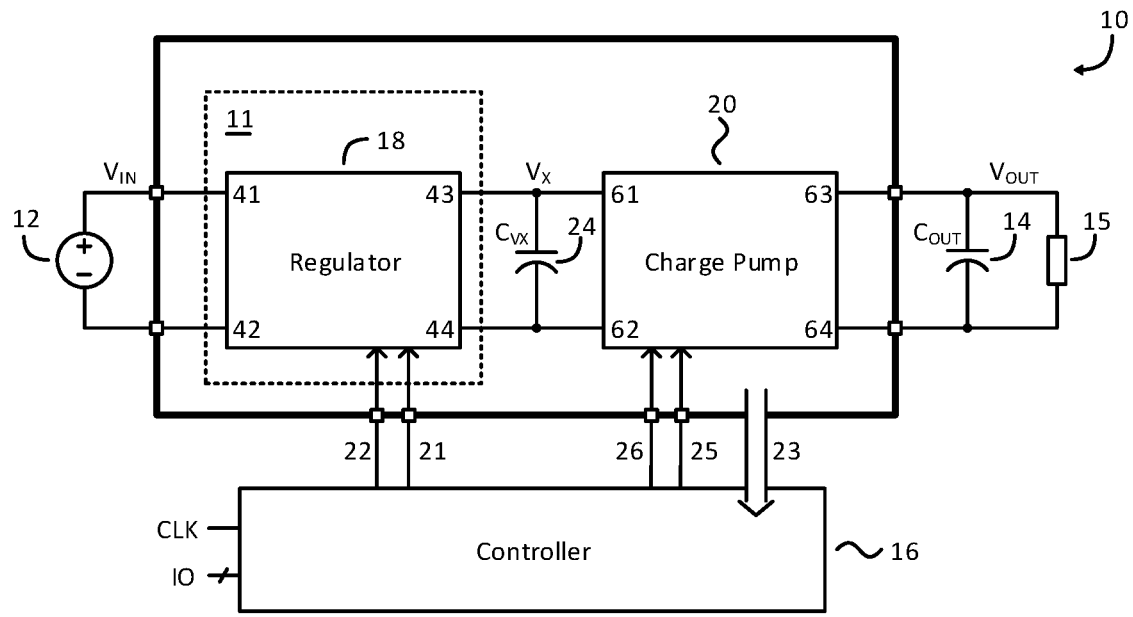
FIG. 19 shows a third example of the FIG. 14 power converter where the adiabatic element comprises a regulator.

FIG. 19 shows a third example of the power converter 10 shown in FIG. 14 in which the adiabatic element 11 comprises a regulator 18. The regulator 18 receives the input voltage VIN and then generates an intermediate voltage VX and provides that intermediate voltage VX to the charge pump 20. The charge pump 20 then transforms the intermediate voltage VX into an output voltage VOUT that is higher than the input voltage VIN.

Figure 20:
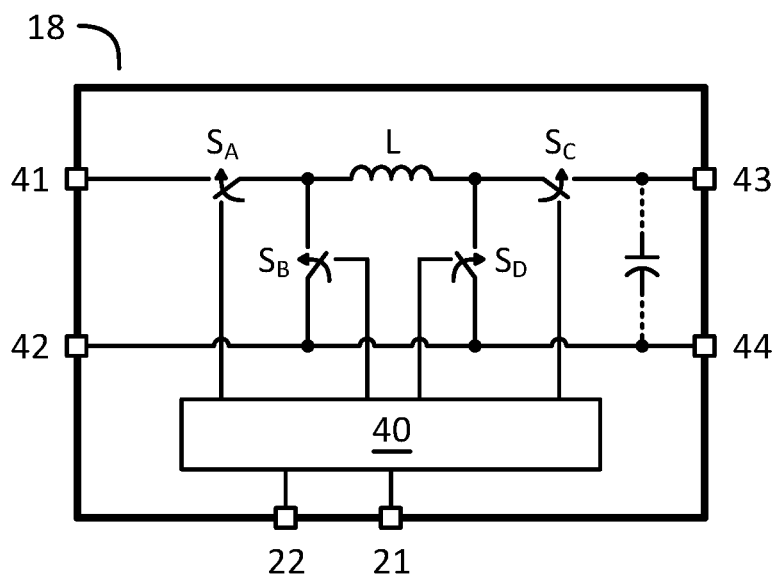
FIGS. 20-22 show examples of the regulator used in the power converter that is shown in FIG. 19.

FIG. 20 shows a regulator 18 that receives an input voltage across first and second regulator-terminals 41, 42 and produces an output voltage across third and fourth regulator-terminals 43, 44. In addition to an inductor L, the regulator 18 includes first, second, third, and fourth regulator-switches SA, SB, SC, SD. A switch-control circuit 40 controls these switches based on third and fourth control signals 21, 22 from the controller 16 in FIG. 19.

In the illustrated embodiment, the regulator 18 can be reconfigured to operate in different modes. The fourth control signal 22 causes such reconfiguration. However, in general, the regulator 18 does not have to be reconfigurable.

When the regulator 18 operates in buck mode, the third regulator-switch SC remains "on" while the fourth regulator-switch SD remains "off" throughout every switching cycle. The first regulator-switch SA transitions between being "on" and "off" based on the duty cycle or on-time of the regulator 18. This duty cycle depends on the third control signal 21. The second regulator-switch SB may transition between being "on" and "off" so that its state is complementary to that of the first regulator-switch SA. Some implementations of such a regulator 18 omit the fourth regulator-switch SD and replace the third regulator-switch SC with a direct connection to the third regulator-terminal 43.

When the regulator 18 operates in boost mode, the first regulator-switch SA remains "on" while the second regulator-switch SB remains "off" throughout every switching cycle. The fourth regulator-switch SD transitions between being "on" and "off" according to the duty cycle or on-time of the regulator 18 as determined by the third control signal 21. The third regulator-switch SC transitions between being "on" and "off" so that its state is complementary to that of the fourth regulator-switch SD. Some implementations reduce the number of switches to just two by omitting the second regulator-switch SB and replacing the first regulator-switch SA with a direct connection to first regulator-terminal 41.

When the regulator 18 operates in buck-boost mode, the first, second, third, and fourth regulator-switches SA, SB, SC, SD transition between being "on" and being "off," some at the same time and some at different times during each switching cycle in response to the third control signal 21. The switch-control circuit 40 controls and sequences transitions of all the regulator-switches SA-SD in such a way as to incorporate any necessary dead-time needed during operation of the first, second, third, and fourth regulator-switches SA, SB, SC, SD according to buck mode, boost mode, or buck-boost mode as specified by the fourth control signal 22.

Based on information indicative of the power converter's operation, the controller 16 sends a third control signal 21 to control the duty cycle of the first through fourth regulator-switches SA-SD and to therefore regulate the output voltage across the third and fourth regulator terminals 43, 44. As such, it defines a feedback loop using some or all of the signals received along the input-signal path 23, the clock signal CLK, and the external signals IO.

Figure 21:
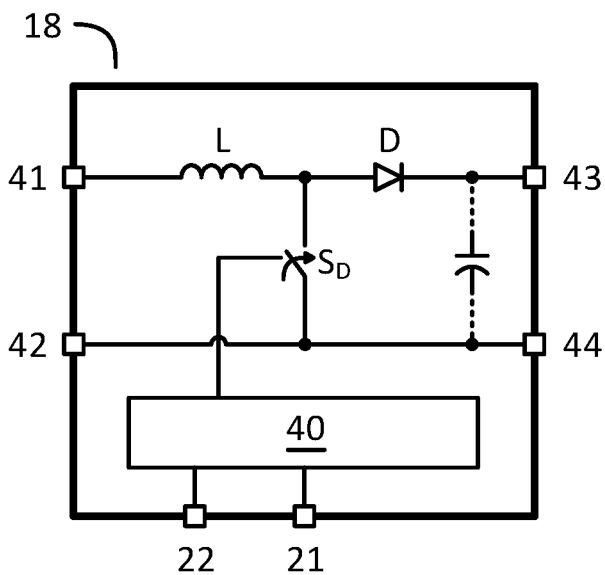
Figure 22:
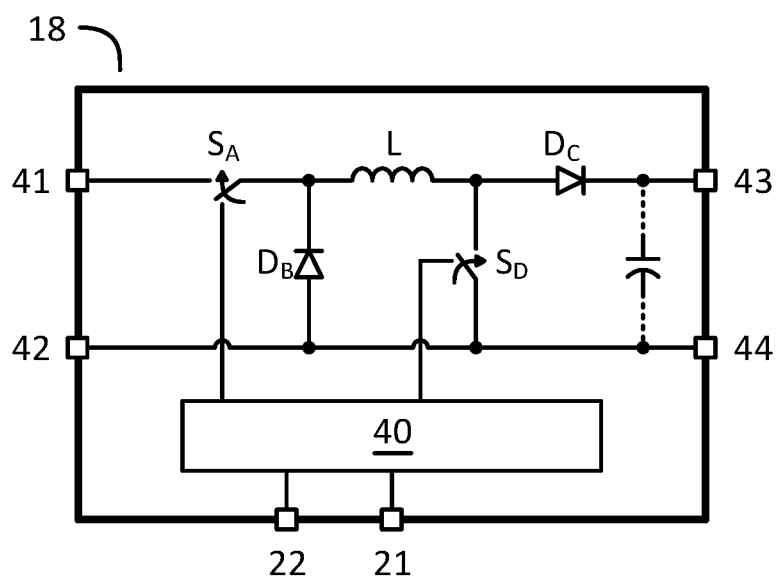

Many other regulator configurations regulate by having switches that periodically cause an inductor to transition between first and second states. Examples of such regulator configurations are a boost converter, shown in FIG. 21, and a non-inverting buck-boost converter, shown in FIG. 22. Because the regulators shown in FIGS. 21-22 are not reconfigurable, the fourth control signal 22 is unnecessary. However, the regulators shown in FIGS. 21-22 all feature one or more regulator-switches that modulate an inductor L, thereby enabling voltage regulation. In some cases, the inductor L stands alone, as shown in FIGS. 20-22. In other cases, the inductor L is part of a transformer. The regulators shown in FIGS. 21-22 also feature one or more regulator-diodes that may also be implemented by switches instead. It should be noted that the regulator-diode D shown in FIG. 21 and the regulator diode DC shown in FIG. 22 can each function as a priming diode similar to the priming diode D21 shown in FIG. 16. Other suitable regulators, which are not shown, include buck converters, flyback converters, Cuk converters, SEPIC converters, resonant converters, multi-level converters, Forward Converters, and Full-Bridge Converters.

Suitable regulators and charge pumps are described in detail in U.S. Pat. Nos. 8,860,396, 8,743,553, 8,723,491, 8,503,203, 8,693,224, 8,724,353, 8,619,445, 9,203,299, 9,742,266, 9,041,459, U.S. Publication No. 2017/0085172, U.S. Pat. Nos. 9,887,622, 9,882,471, PCT Publication No. WO2017161368, PCT Publication No. WO2017/091696, PCT Publication No. WO2017/143044, PCT Publication No. WO2017/160821, PCT Publication No. WO2017/156532, PCT Publication No. WO2017/196826, and U.S. Publication No. 2017/0244318.

The regulator 18 shown in FIG. 20 can be used to prime the stack nodes VC1-VC5 using previously-described methods. One such method involves increasing the slew rate or rise time of the input voltage VIN and closing regulator-switches SA and SC while preventing reverse inductor-current flow. Another method involves controlling the third regulator-switch SC in a similar fashion as the priming switch S21 in FIG. 16 prior to both charge pump 20 operation and regulator 18 operation. Another alternative is to use the first regulator-switch SA as a priming-switch while keeping the third regulator-switch SC closed and the remaining regulator-switches open. The switch-control circuit 40 may be used to control a particular regulator-switch as a priming-switch according to fourth control signal 22 as part of reconfiguration at startup.

For step-up power converters comprising a regulator 18 that drives a charge pump 20, startup may include operating the regulator 18 before the charge pump 20 begins switching, switching the charge pump 20 first before the regulator 18 begins to operate, or operating both the regulator 18 and the charge pump 20 at the same time.

Operating the regulator 18 first has the advantage of priming the intermediate voltage VX and the stack-nodes VC1-VC5 within the charge pump 20 in a more controlled and accurate manner than the previously proposed priming methods. The extent to which the regulator 18 primes the intermediate voltage VX under these circumstances depends on its duty cycle. If the regulator 18 can already operate with a fixed minimum duty cycle, the simplest method is to simply use this fixed minimum duty cycle until the feedback loop takes over and sends appropriate information through the third control signal 21 to update the duty cycle as needed for output voltage regulation.

However, a fixed minimum duty cycle may not sufficiently prime the intermediate voltage VX, especially when the input voltage VIN provided to the power converter 10 is low. One solution is to use an adaptive duty cycle that can be adjusted to be greater than minimum, depending on the input voltage VIN detected at the start of the regulator's operation. The lower the input voltage VIN, the larger the positive adjustment to the adaptive duty cycle in order to guarantee the intermediate voltage VX gets primed to or above a minimum level. Conversely, the higher the input voltage VIN detected at the start of the regulator's operation, the smaller the positive adjustment to the adaptive duty cycle since less priming is needed at the intermediate voltage VX and at the stack-nodes.

Alternatively, the regulator 18 may just rely on the feedback loop from the beginning of its operation and then wait to enable the charge pump's operation by comparing the intermediate voltage VX to a predetermined voltage-threshold. While the intermediate voltage VX has not yet reached the predetermined voltage-threshold, the charge pump 20 does not engage in switching. Conversely once the regulator 18 has increased the intermediate voltage VX to or above a predetermined voltage-threshold, the controller 16 provides a second control signal 26 to enable the charge pump 20 to carry out switching, as indicated in FIG. 19.

An alternative method measures the input voltage VIN before either the regulator 18 or the charge pump 20 begins operation and then determines, based on the input voltage VIN, whether priming is needed at all. If priming is needed, then any of the aforementioned priming methods involving operating the regulator 18 first may be used. Otherwise, the power converter 10 can choose to operate the charge pump 20 before operating the regulator 18, or it can choose to operate both the charge pump 20 and the regulator 18 simultaneously for a faster startup.

In some implementations, a tangible and non-transitory computer-readable storage-medium includes a database representative of one or more components of the power converter 10. Among these are implementations in which the database includes data representative of a charge pump 20 that has been optimized to promote low-loss operation of the charge pump 20.

As used herein, a computer-readable storage-medium includes any non-transitory storage media accessible by a computer during use to provide instructions and/or data to the computer. Examples of computer-readable storage-media include storage media such as magnetic disks, optical disks, and semiconductor memories. These are non-abstract structures that are made of matter having interacting baryons and leptons.

In particular embodiments, a database representative of the system is a database or other data structure that is readable by a program and used, directly or indirectly, to fabricate the hardware comprising the system. The database is manifested in the real world by rearrangements of certain attributes of matter such as charge and direction of spin.

One example of such a database is a behavioral-level description or register-transfer level (RTL) description of the hardware functionality in a high-level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, alternatively, the database may itself be the netlist, with or without the synthesis library, or the data set.

Various features, aspects, and embodiments of switched-capacitor power-converters have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications.

Additionally, the terms and expressions that have been employed herein are used as terms of description and not of limitation. There is no intention, in the use of such terms and expressions, of excluding any equivalents of the features shown and described, or portions thereof. It is recognized that various modifications are possible within the scope of the claims. Other modifications, variations, and alternatives are also possible. Accordingly, the claims are intended to cover all such equivalents.

Having described the invention and a preferred embodiment thereof, what is claimed as new and secured by letters patent is:

1. A step-up power converter comprising:
    a cascade multiplier to convert an input voltage into an output voltage, comprising:
        a plurality of pump capacitors to be coupled to a plurality of stack switches via a corresponding plurality of stack nodes;
        an input terminal for receiving an input voltage from a voltage source; and
        an output terminal having an output voltage, wherein the input voltage is less than the output voltage;
    a bypass path connecting the input terminal directly to one of said plurality of stack nodes while bypassing at least one other stack node, such that the stack node is to be charged by the input voltage to a stack node voltage value;
    a clock to generate a timing signal; and
    a controller to generate one or more control signals based, at least in part, on the timing signal to control the plurality of stack switches to facilitate one or more state transitions between a first operating state and a second operating state of the cascade multiplier based, at least in part, on the input voltage,
    wherein, in the first operating state:
        a first stack node of the plurality of stack nodes to have a first stack node voltage, and
        a second stack node of the plurality of stack nodes to have a second stack node voltage, the second stack node voltage to comprise a voltage insufficient to operate a corresponding stack switch of the plurality of stack switches, and
    wherein, in the second operating state, the second stack node voltage to be adjusted to comprise a voltage sufficient to operate the corresponding stack switch of the plurality of stack switches.

2. The step-up power converter of claim 1, wherein, in the first operating state, the second stack node voltage to comprise a voltage lower than the first stack node voltage.

3. The step-up power converter of claim 1, wherein, in the second operating state, the second stack-node voltage to comprise a voltage higher than the first stack node voltage.

4. The step-up power converter of claim 1, wherein, in the second operating state, the second stack node voltage to be adjusted to comprise a voltage increased by an integer multiple of the input voltage.

5. The step-up power converter of claim 1, wherein the corresponding stack switch to comprise a stack switch operable via the second stack node.

6. The step-up power converter of claim 1, wherein the plurality of pump capacitors to further comprise a second pump capacitor, and wherein at least one pump capacitor of the plurality of pump capacitors is to be coupled to the first stack node and the second pump capacitor is to be coupled to the second stack node.

7. The step-up power converter of claim 1, wherein the corresponding stack switch is to interconnect the second stack node and the input terminal.

8. The step-up power converter of claim 1, wherein the bypass path ceases conducting current upon initiation of the transition from the first operating state to the second operating state.

9. The step-up power converter of claim 1, wherein the step-up power converter further comprises an undervoltage lockout circuit to prevent the corresponding stack-switch from being operated while the second stack-node voltage is below a predetermined threshold.

10. The step-up power converter of claim 9, wherein the undervoltage lockout circuit comprises a comparator having a first and a second input ports and an output port, the comparator to compare a tap voltage to be provided via the first input port with a predetermined threshold voltage to be provided via the second input port and to provide, via the output port, a logic signal upon a determination that the tap voltage is greater than the predetermined threshold voltage.

11. The step-up power converter of claim 10, wherein the logic signal to be used, at least in part, to indicate that the corresponding stack-switch is ready to be operated and an absence of the logic signal to be used, at least in part, to indicate that the corresponding stack-switch is not ready to be operated.

12. The step-up power converter of claim 9, wherein the undervoltage lockout circuit comprises a first and a second resistor to be coupled across a supply voltage to form a voltage divider.

13. The step-up power converter of claim 1, wherein, during the first operating state, a current is to flow between the input terminal and the output terminal and wherein, during the second operating state, the current is to cease flowing between the input terminal and the output terminal.

14. The step-up power converter of claim 1, wherein the bypass path is connected to the stack node of at least one output capacitor of the step-up power converter.

15. The step-up power converter of claim 1, wherein the bypass path is configured to, upon a voltage drop at the stack node below the input voltage value, conduct a current.

16. The step-up power converter of claim 1, wherein the bypass path further comprises a bypass switch.

17. The step-up power converter of claim 1, wherein the bypass path comprises a diode.

18. The step-up power converter of claim 1, further comprising a plurality of phase nodes connected to the plurality of pump capacitors.

19. The step-up power converter of claim 1, further comprising a bypass switch and a diode.

\* \* \* \* \*